(12) United States Patent
Valenzuela

(10) Patent No.: US 10,488,185 B1
(45) Date of Patent: Nov. 26, 2019

(54) METHODS AND SYSTEMS FOR CHARACTERIZING A SURFACE OF A STRUCTURAL COMPONENT

(71) Applicant: The Boeing Company, Chicago, IL (US)

(72) Inventor: Dario I. Valenzuela, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/353,329

(22) Filed: Mar. 14, 2019

(51) Int. Cl.
| | | |
|---|---|---|
| G01B 11/25 | (2006.01) | |
| G01B 11/03 | (2006.01) | |
| G06T 7/593 | (2017.01) | |
| G06T 7/00 | (2017.01) | |
| G01B 11/255 | (2006.01) | |
| G01B 11/14 | (2006.01) | |
| B64C 1/06 | (2006.01) | |

(52) U.S. Cl.
CPC .......... G01B 11/2545 (2013.01); G01B 11/03 (2013.01); G01B 11/14 (2013.01); G01B 11/255 (2013.01); G06T 7/001 (2013.01); G06T 7/593 (2017.01); B64C 1/068 (2013.01); B64C 1/069 (2013.01)

(58) Field of Classification Search
CPC ......... G01B 11/03; G01B 11/14; G01B 11/22; G01B 11/24; G01B 11/2408; G01B 11/25416; G01B 11/2425; G01B 11/25; G01B 11/2504; G01B 11/2513; G01B 11/2518; G01B 11/2545; G01B 11/255; G06T 7/001; G06T 7/50; G06T 7/55; G06T 7/564; G06T 7/586; G06T 7/593; G06T 7/596; B64C 1/068; B64C 1/069
USPC ................................................ 356/601–614
See application file for complete search history.

(56) References Cited

U.S. PATENT DOCUMENTS

| | | | | |
|---|---|---|---|---|
| 6,826,299 | B2 * | 11/2004 | Brown ............... | G01B 11/2545 345/419 |
| 7,137,162 | B2 * | 11/2006 | Spencer ................. | B64F 1/002 14/71.5 |
| 7,286,698 | B2 * | 10/2007 | Arai .................... | G01B 11/2504 345/419 |
| 7,454,265 | B2 * | 11/2008 | Marsh .................. | G01B 11/002 700/159 |
| 7,587,258 | B2 * | 9/2009 | Marsh .................. | G01B 11/002 356/3 |

(Continued)

*Primary Examiner* — Gordon J Stock, Jr.
(74) *Attorney, Agent, or Firm* — McDonnell Boehnen Hulbert & Berghoff LLP

(57) ABSTRACT

A method includes projecting a first reference image onto a first surface region that includes a component target; capturing a first pair of images that both include (i) the first reference image, (ii) a first ring target located at a first position on an inner ring, (iii) a third ring target located at a third position on an outer ring, and (iv) the component target; projecting a second reference image onto a second surface region; capturing a second pair of images that both include (i) the second reference image, (ii) a second ring target located at a second position on the inner ring, and (iii) a fourth ring target located at a fourth position on the outer ring; and based on the first pair of images and the second pair of images, generating coordinate data that defines the first surface region and the second surface region within a coordinate space.

20 Claims, 22 Drawing Sheets

(56) References Cited

U.S. PATENT DOCUMENTS

| | | | | |
|---|---|---|---|---|
| 7,743,660 B2 * | 6/2010 | Marsh | G01N 29/223 | |
| | | | 73/633 | |
| 7,783,376 B2 * | 8/2010 | Marsh | G01C 11/02 | |
| | | | 356/3 | |
| 7,787,979 B2 * | 8/2010 | Marsh | G05B 19/401 | |
| | | | 700/119 | |
| 8,284,240 B2 * | 10/2012 | Saint-Pierre | G01B 11/03 | |
| | | | 348/47 | |
| 9,182,220 B2 * | 11/2015 | Kochi | G01B 11/24 | |
| 9,187,188 B2 * | 11/2015 | Richter | G06T 7/001 | |
| 9,310,317 B2 * | 4/2016 | Georgeson | G01B 11/24 | |
| 9,369,689 B1 * | 6/2016 | Tran | G06T 7/593 | |
| 9,426,425 B2 * | 8/2016 | Vichniakov | G01B 11/002 | |
| 9,599,983 B2 | 3/2017 | Valenzuela et al. | | |
| 9,645,012 B2 * | 5/2017 | Marsh | H04N 5/332 | |
| 10,002,431 B2 * | 6/2018 | Sridhar | G01B 11/2513 | |
| 10,132,617 B2 * | 11/2018 | Torngren | F03D 17/00 | |
| 10,267,627 B2 * | 4/2019 | Du | G01B 11/25 | |
| 10,275,565 B2 * | 4/2019 | Vasquez | B64C 1/26 | |
| 10,371,506 B2 * | 8/2019 | Chang | B64F 5/00 | |
| 10,386,175 B2 * | 8/2019 | Lacome | G01B 11/002 | |
| 2010/0292955 A1 * | 11/2010 | Van Stan, II | G01B 11/026 | |
| | | | 702/159 | |
| 2015/0097931 A1 * | 4/2015 | Hatzilias | G01B 11/2513 | |
| | | | 348/50 | |
| 2015/0240987 A1 * | 8/2015 | DesJardien | G01C 11/02 | |
| | | | 348/46 | |
| 2017/0054954 A1 * | 2/2017 | Keitler | G06T 7/74 | |
| 2017/0132355 A1 | 5/2017 | Vasquez et al. | | |
| 2018/0154524 A1 * | 6/2018 | Tombe | B64F 5/10 | |
| 2018/0339380 A1 * | 11/2018 | Inagaki | B21J 15/142 | |

* cited by examiner

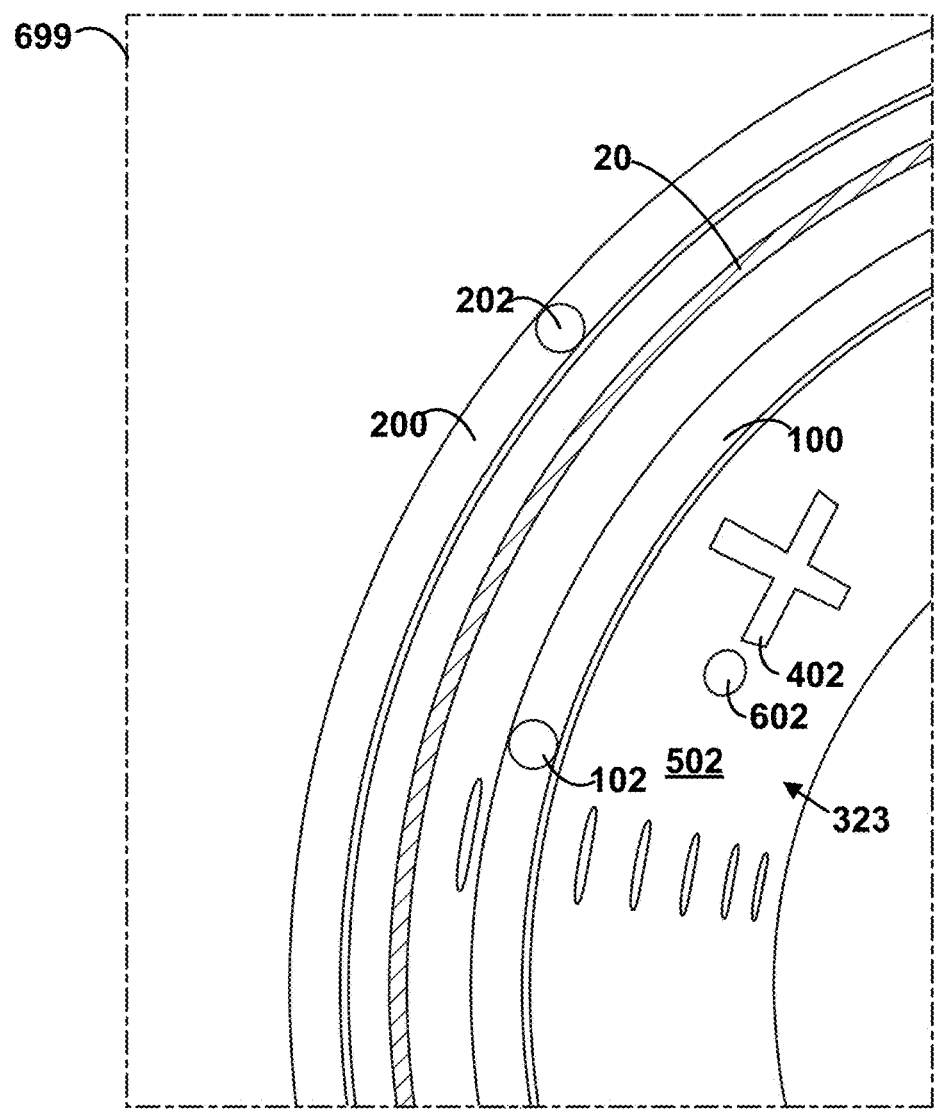
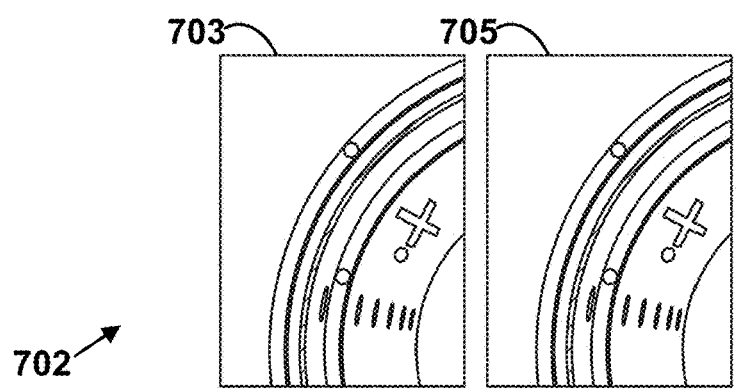
FIG. 6

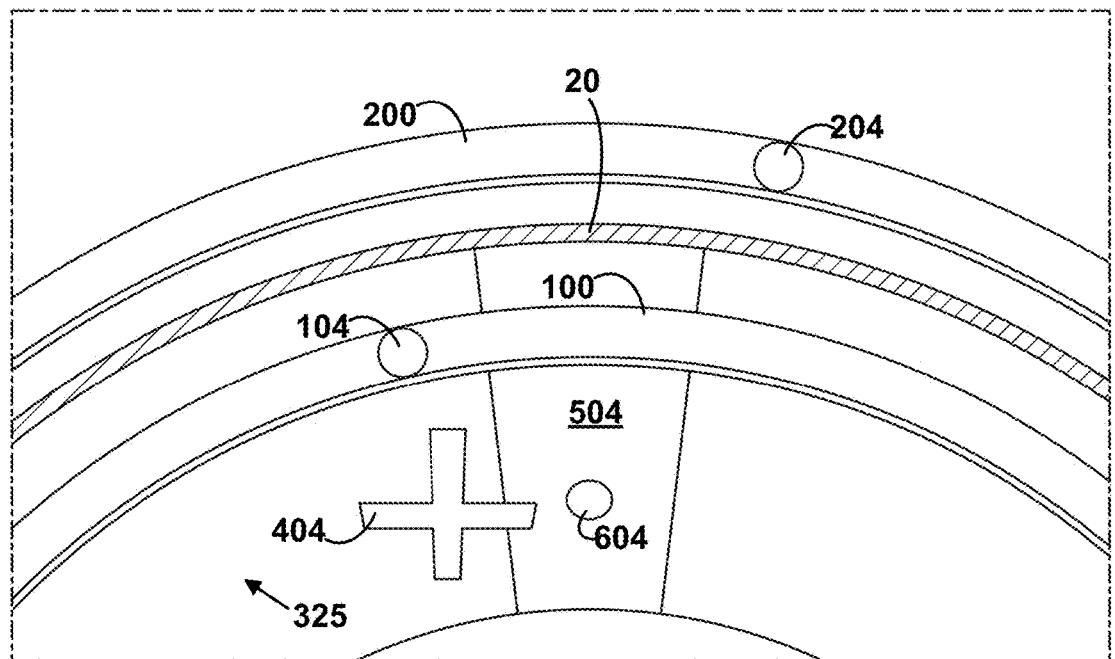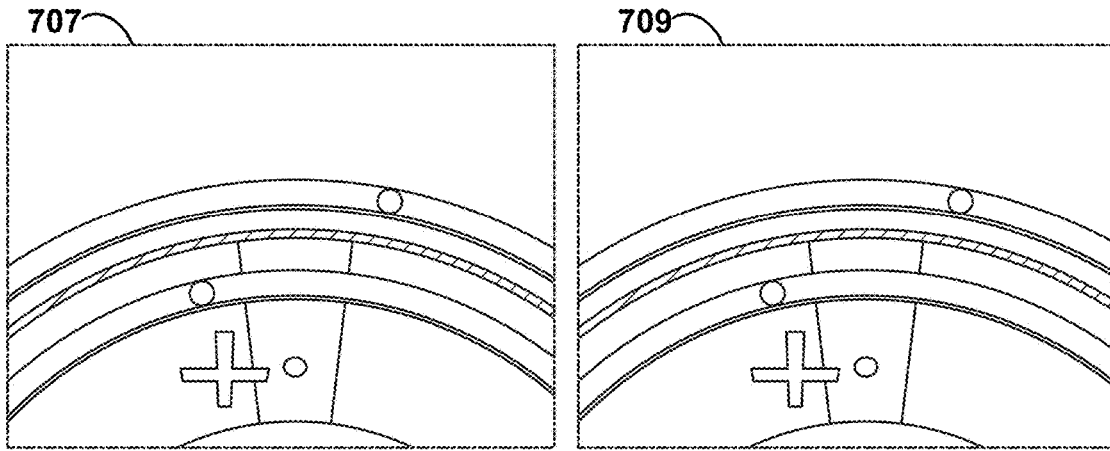
FIG. 7

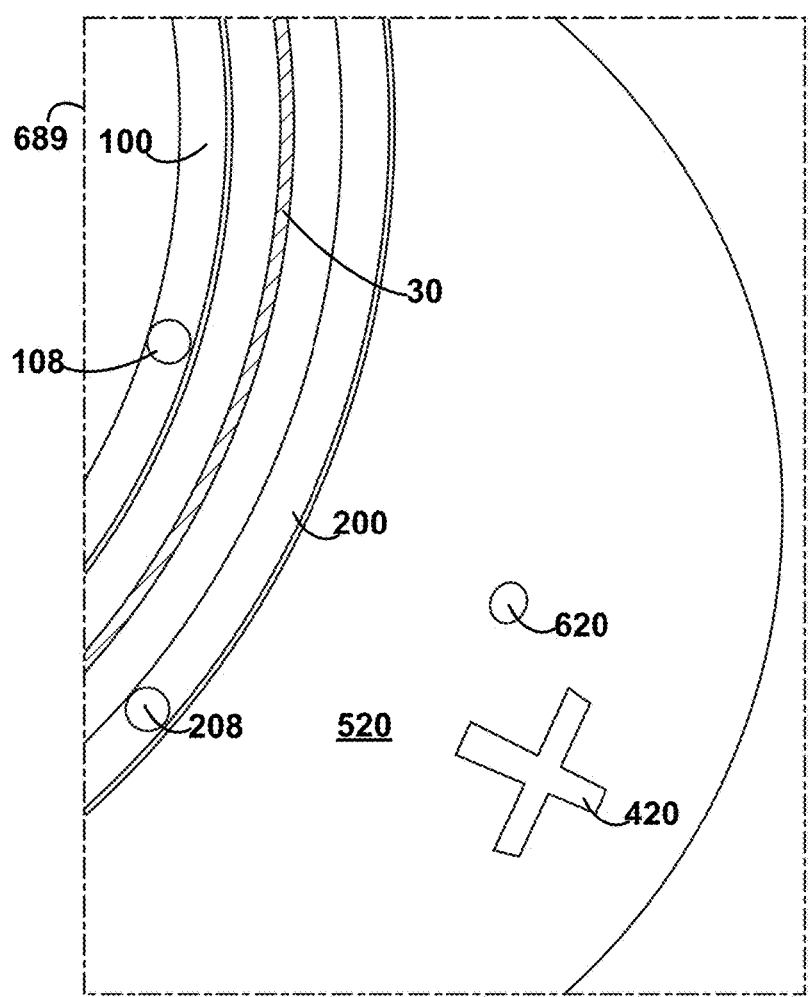
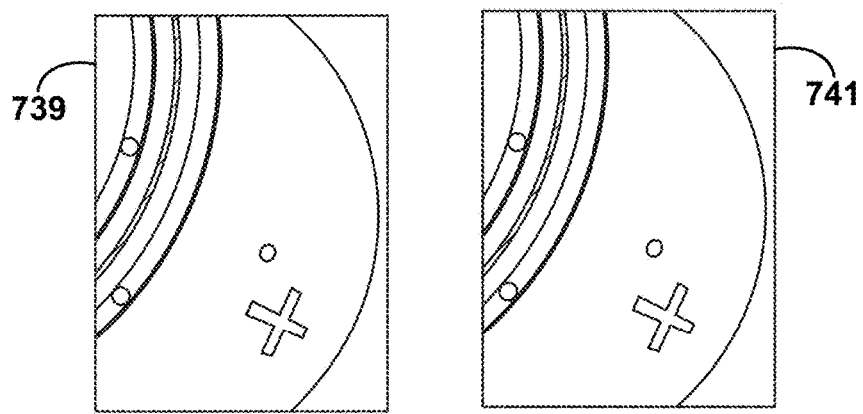
FIG. 16

912 — PRIOR TO CAPTURING THIRD STEREO IMAGE PAIR AND CAPTURING FOURTH STEREO IMAGE PAIR, POSITIONING INNER RING AND OUTER RING ADJACENT TO END OF SECOND STRUCTURAL COMPONENT THAT IS CONFIGURED FOR MALE-TO-FEMALE CONNECTION WITH FIRST STRUCTURAL COMPONENT

FIG. 21 — 913

914 — BASED ON FIRST COORDINATE DATA AND SECOND COORDINATE DATA, GENERATING THIRD COORDINATE DATA REPRESENTING DIMENSIONS OF SHIM CONFIGURED FOR SUBSTANTIALLY FILLING THREE-DIMENSIONAL VOLUME BETWEEN FEMALE END OF FIRST STRUCTURAL COMPONENT AND MALE END OF SECOND STRUCTURAL COMPONENT

FIG. 22 — 915

916 — BASED ON FIRST COORDINATE DATA AND SECOND COORDINATE DATA, GENERATING THIRD COORDINATE DATA REPRESENTING THREE-DIMENSIONAL VOLUME BETWEEN FEMALE END OF FIRST STRUCTURAL COMPONENT AND MALE END OF SECOND STRUCTURAL COMPONENT

FIG. 23 — 917

METHODS AND SYSTEMS FOR CHARACTERIZING A SURFACE OF A STRUCTURAL COMPONENT

FIELD

The present disclosure generally relates to systems and methods for imaging a component surface, and more specifically to systems and methods for using a ring structure as a frame of reference as part of a procedure for imaging a surface of an aircraft structural component.

BACKGROUND

Some aircraft (e.g., commercial airliners) are assembled by attaching various components of the aircraft together. For example, a fuselage of a commercial airliner is typically composed of two or more cylindrical sections that are inserted into one another via male-to-female connections. That is, a male end of a first section of the fuselage can be inserted into a female end of a second section of the fuselage. A male end of the second section of the fuselage can be inserted into a female end of a third section the fuselage, and so on. Difficulties can arise when a male end doesn't make a snug fit with a corresponding female end of another section.

These difficulties can be mitigated by manufacturing a cylindrical shim that fits radially between the male and female ends to fill the radial space between the male and female ends. For such a shim to be effective in improving the fit between sections, it generally should be manufactured to match the space between the male and female ends with very high precision. Known methods for measuring the radial gap between corresponding male and female ends of fuselage sections are generally very slow or too imprecise to be effective. Thus, a need exists for systems and methods that better facilitate high-precision shim production for mating female and male ends of aircraft components.

SUMMARY

One aspect of the disclosure is a system for characterizing a surface of a structural component, the system comprising: an inner ring comprising a first ring target at a first position on the inner ring and a second ring target at a second position on the inner ring; and an outer ring comprising a third ring target at a third position on the outer ring and a fourth ring target at a fourth position on the outer ring; one or more processors; and a computer readable medium storing instructions that, when executed by the one or more processors, cause the system to perform functions comprising: projecting a first reference image onto a first surface region of the structural component, wherein the first surface region includes a component target; capturing a first stereo image pair comprising a first left image and a first right image that both include (i) the first reference image, (ii) the first ring target, (iii) the third ring target, and (iv) the component target; projecting a second reference image onto a second surface region of the structural component; capturing a second stereo image pair comprising a second left image and a second right image that both include (i) the second reference image, (ii) the second ring target, and (iii) the fourth ring target; and based on the first stereo image pair and the second stereo image pair, generating coordinate data that defines (i) the first surface region within a three-dimensional coordinate space and (ii) the second surface region within the three-dimensional coordinate space.

Another aspect of the disclosure is a non-transitory computer readable medium storing instructions that, when executed by one or more processors of a system, cause the system to perform functions for characterizing a surface of a structural component, the functions comprising: projecting a first reference image onto a first surface region of the structural component, wherein the first surface region includes a component target; capturing a first stereo image pair comprising a first left image and a first right image that both include (i) the first reference image, (ii) a first ring target located at a first position on an inner ring, (iii) a third ring target located at a third position on an outer ring, and (iv) the component target; projecting a second reference image onto a second surface region of the structural component; capturing a second stereo image pair comprising a second left image and a second right image that both include (i) the second reference image, (ii) a second ring target located at a second position on the inner ring, and (iii) a fourth ring target located at a fourth position on the outer ring; and based on the first stereo image pair and the second stereo image pair, generating coordinate data that defines (i) the first surface region within a three-dimensional coordinate space and (ii) the second surface region within the three-dimensional coordinate space.

A further aspect of the disclosure is a method for characterizing a surface of a structural component, the method comprising: projecting a first reference image onto a first surface region of the structural component, wherein the first surface region includes a component target; capturing a first stereo image pair comprising a first left image and a first right image that both include (i) the first reference image, (ii) a first ring target located at a first position on an inner ring, (iii) a third ring target located at a third position on an outer ring, and (iv) the component target; projecting a second reference image onto a second surface region of the structural component; capturing a second stereo image pair comprising a second left image and a second right image that both include (i) the second reference image, (ii) a second ring target located at a second position on the inner ring, and (iii) a fourth ring target located at a fourth position on the outer ring; and based on the first stereo image pair and the second stereo image pair, generating coordinate data that defines (i) the first surface region within a three-dimensional coordinate space and (ii) the second surface region within the three-dimensional coordinate space.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed descrip

FIG. 6 is a schematic diagram of a system and an inner radial surface of a structural component, according to an example.

FIG. 7 is a schematic diagram of a system and an inner radial surface of a structural component, according to an example.

FIG. 16 is a schematic diagram of a system and an outer radial surface of a structural component, according to an example.

FIG. 21 is a block diagram of a method, according to an example.

FIG. 22 is a block diagram of a method, according to an example.

FIG. 23 is a block diagram of a method, according to an example.

DETAILED DESCRIPTION

Figure 1:
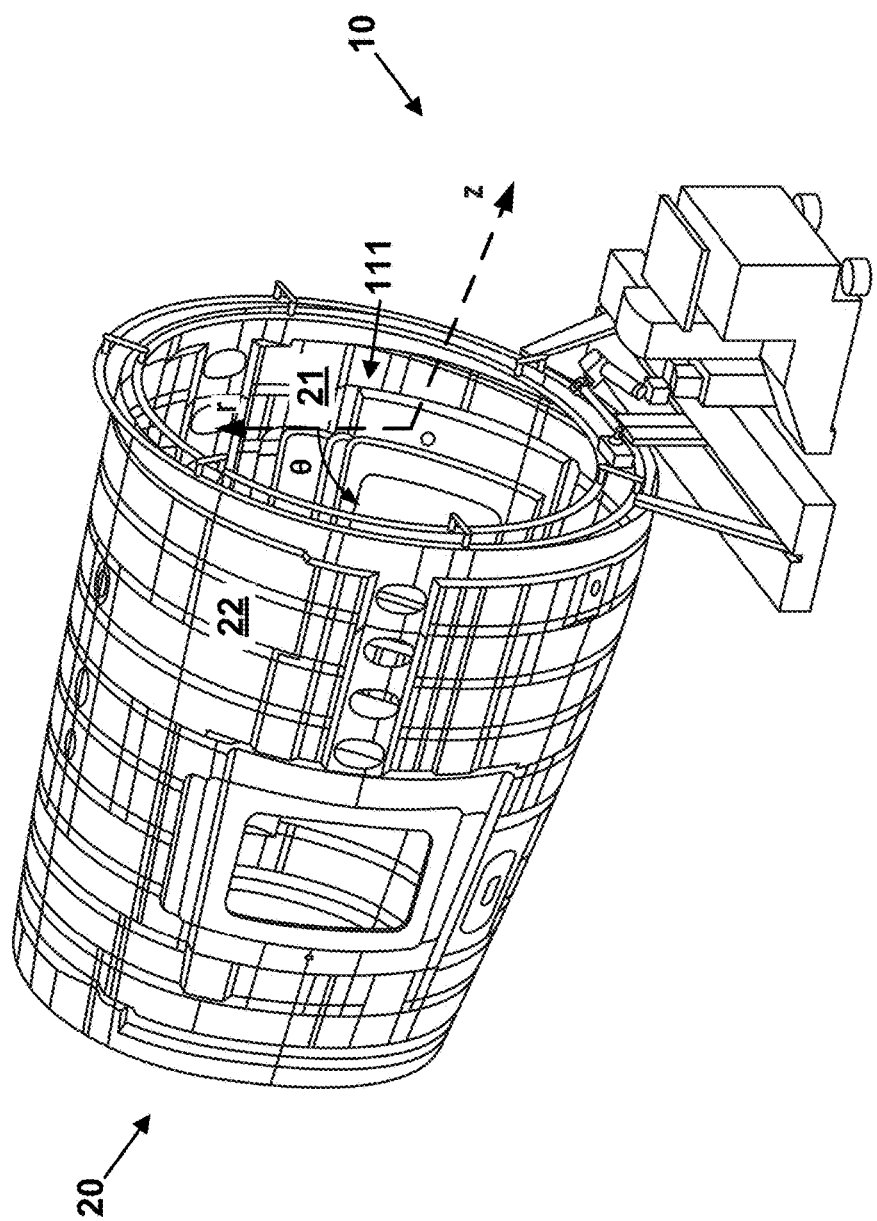
- FIG. 1 is a schematic diagram of a system for characterizing a surface of a structural component, according to an example.

As discussed above, there exists a need for systems and methods that better facilitate high-precision shim production for mating female and male ends of aircraft components. Accordingly, this disclosure includes such systems and methods.

One aspect of the disclosure is a system for characterizing a surface of a structural component such as a cylindrical section of a fuselage. For example, the system could be used to characterize an inner radial surface or an outer radial surface of the fuselage section. The system includes an inner ring and an outer ring, both of which can be made of steel, composites, or other materials that can form a rigid structure. The inner ring can be substantially parallel to, or coplanar with, the outer ring. Additionally, a projection of the outer ring onto a plane defined by the inner ring can substantially surround the inner ring. The inner ring and the outer ring can be fixed to each other and/or provided on a wheeled platform so that the inner ring and the outer ring are movable. The inner ring and the outer ring will typically have respective radii similar in size to a radius of the structural component. In some cases, the radius of the inner ring is somewhat smaller than an inner radius of the structural component, whereas the radius of the outer ring can be somewhat larger than an outer radius of the structural component.

The inner ring includes a first ring target at a first position on the inner ring and a second ring target at a second position on the inner ring. The first ring target and the second ring target generally take the form of reflectors that have some degree of contrast in appearance from the inner ring. The first ring target and the second ring target can be affixed to the inner ring or can be integrated with the inner ring. In addition, the inner ring can have additional ring targets at various positions around the inner ring.

The outer ring includes a third ring target at a third position on the outer ring and a fourth ring target at a fourth position on the outer ring. The third ring target and the fourth ring target generally take the form of reflectors that have some degree of contrast in appearance from the outer ring. The third ring target and the fourth ring target can be affixed to the outer ring or can be integrated with the outer ring. In addition, the outer ring can have additional ring targets at various positions around the outer ring.

The system also includes one or more processors and a computer readable medium storing instructions that, when executed by the one or more processors, cause the system to perform functions.

The functions include projecting (e.g., via an optical projector) a first reference image (e.g., crosshairs or a series of substantially parallel lines) onto a first surface region of the structural component. In this context, the first surface region includes a component target such as a reflector that has some degree of contrast in appearance from the first surface region (e.g., similar to the aforementioned ring targets). The component target can be affixed to the first surface region or can be integrated with the first surface region.

The functions further include capturing (e.g., via a pair of cameras) a first stereo image pair including a first left image and a first right image that both include (i) the first reference image, (ii) the first ring target, (iii) the third ring target, and (iv) the component target. That is, the first left image and the first right image both capture the first reference image, a ring target on the inner ring, a ring target on the outer ring, and a component target on the structural component. Prior to capturing the first stereo image pair, the inner ring and the outer ring are generally moved to be adjacent to an end of the structural component such that the first ring target, the third ring target, and the component target are within respective fields of view of the cameras.

The functions further include projecting a second reference image onto a second surface region of the structural component. The second reference image could be substantially similar to the first reference image, but other examples are possible. The second surface region will generally include portions of the structural component that are not included in the first surface region, but could also include portions of the structural component that are included in the first surface region. That is, some overlap can exist between the first surface region and the second surface region.

The functions further include capturing a second stereo image pair including a second left image and a second right image that both include (i) the second reference image, (ii) the second ring target, and (iii) the fourth ring target. That is, the second left image and the second right image both capture the second reference image, a ring target on the inner ring, and a ring target on the outer ring. Prior to capturing the second stereo image pair, the cameras can be repositioned such that the second ring target and the fourth ring target are within respective fields of view of the cameras.

The functions further include, based on the first stereo image pair and the second stereo image pair, generating coordinate data that defines (i) the first surface region within a three-dimensional coordinate space and (ii) the second surface region within the three-dimensional coordinate space. For example, the first reference image will generally appear differently in the first left image when compared to the first right image due to projection distortion caused by the shape of the first surface region and the different points of view of the cameras. The difference in projection distortion can be used to generate shape data that defines the shape of the first surface region. The position and/or orientation of the first surface region within a three-dimensional coordinate space can be determined based on (i) the first shape data, (ii) a position of the first ring target within the first stereo image pair, (iii) a position of the third ring target within the first stereo image pair, and (iv) a position of the component target within the first stereo image pair.

Additionally, the second reference image will also generally appear differently in the second left image when compared to the second right image due to projection distortion caused by the shape of the second surface region and the different points of view of the cameras. The difference in projection distortion can be used to generate shape data that defines the shape of the second surface region. The position and/or orientation of the second surface region within the (same) coordinate space can be determined based on (i) the second shape data, (ii) a position of the second ring target within the second stereo image pair, and (iii) a position of the fourth ring target within the second stereo image pair. The second stereo image pair need not capture a component target on the second surface region. In some examples, additional surface regions of the structural component are analyzed such that an entirety of the inner radial surface or outer radial surface of the structural component can be defined by coordinate data. This process can be repeated for an additional structural component. The coordinate data defining surfaces of the two structural components can be used to characterize a radial gap between the two surfaces and to manufacture a shim that substantially fills the gap.

The systems and methods disclosed herein can be advantageous because, when compared to conventional systems and methods, the systems and methods disclosed herein can allow for improved accuracy in surface characterization and/or decreased process time.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Referring now to FIG. 1, a system 10 is illustrated. The system 10 can be used for characterizing a surface 21 or a surface 22 of a first structural component 20 (e.g., a section of an aircraft fuselage). The system 10 can be used to characterize the surface 21 or the surface 22 within a three-dimensional coordinate space 111 (e.g., a cylindrical coordinate space).

Figure 2:
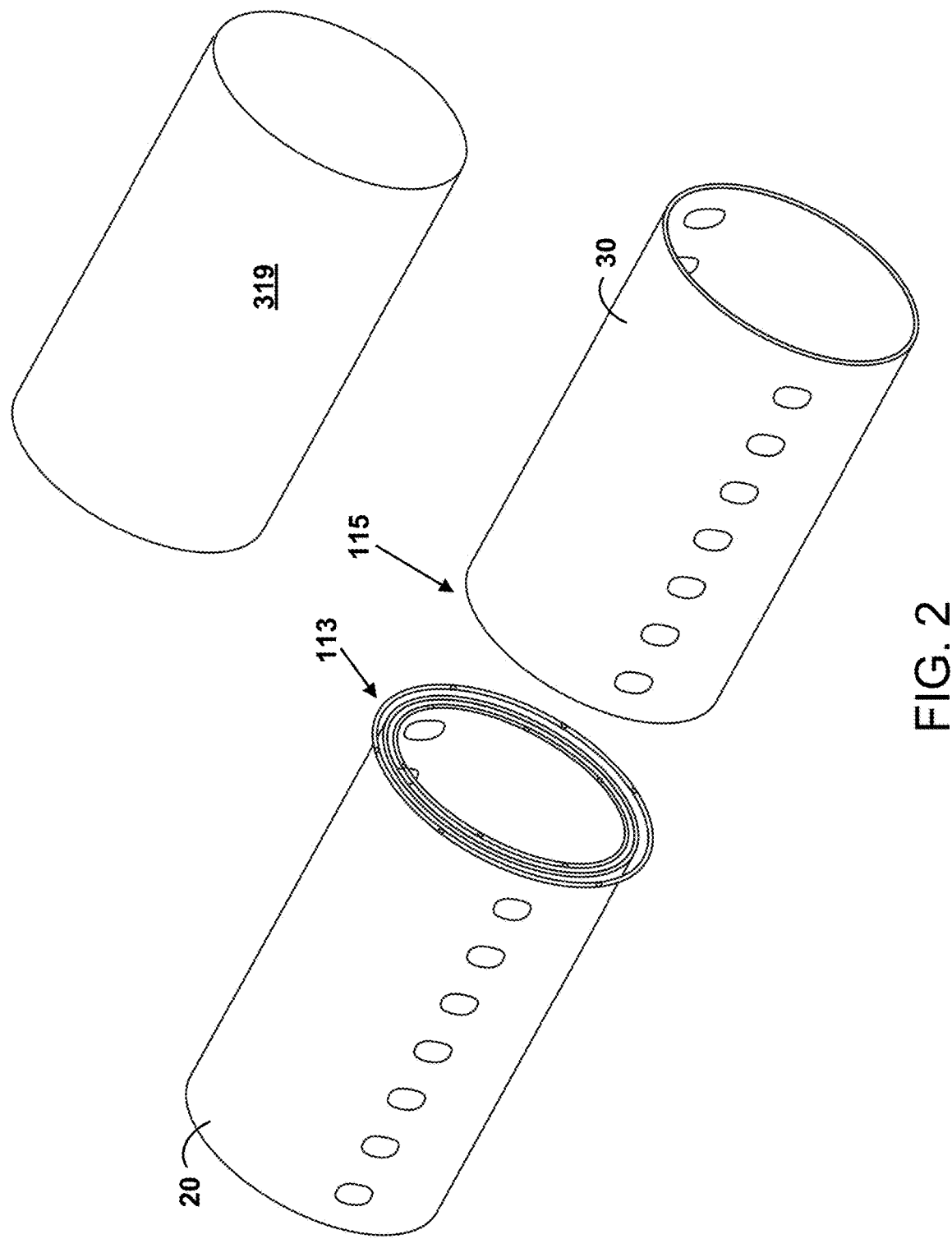
FIG. 2 is a schematic diagram of a system, two structural components, and a shim, according to an example.

FIG. 2 shows the first structural component 20 having a female end 113, a second structural component 30 having a male end 115, and a shim 319. The system 10 can be used to analyze an inner radial surface of the female end 113 and an outer radial surface of the male end 115 to determine parameters for manufacturing the shim 319. In FIG. 2, the first structural component 20, the second structural component 30, and the shim 319 are not necessarily depicted to scale. This process for designing and manufacturing a shim is described in more detail below.

Figure 3:
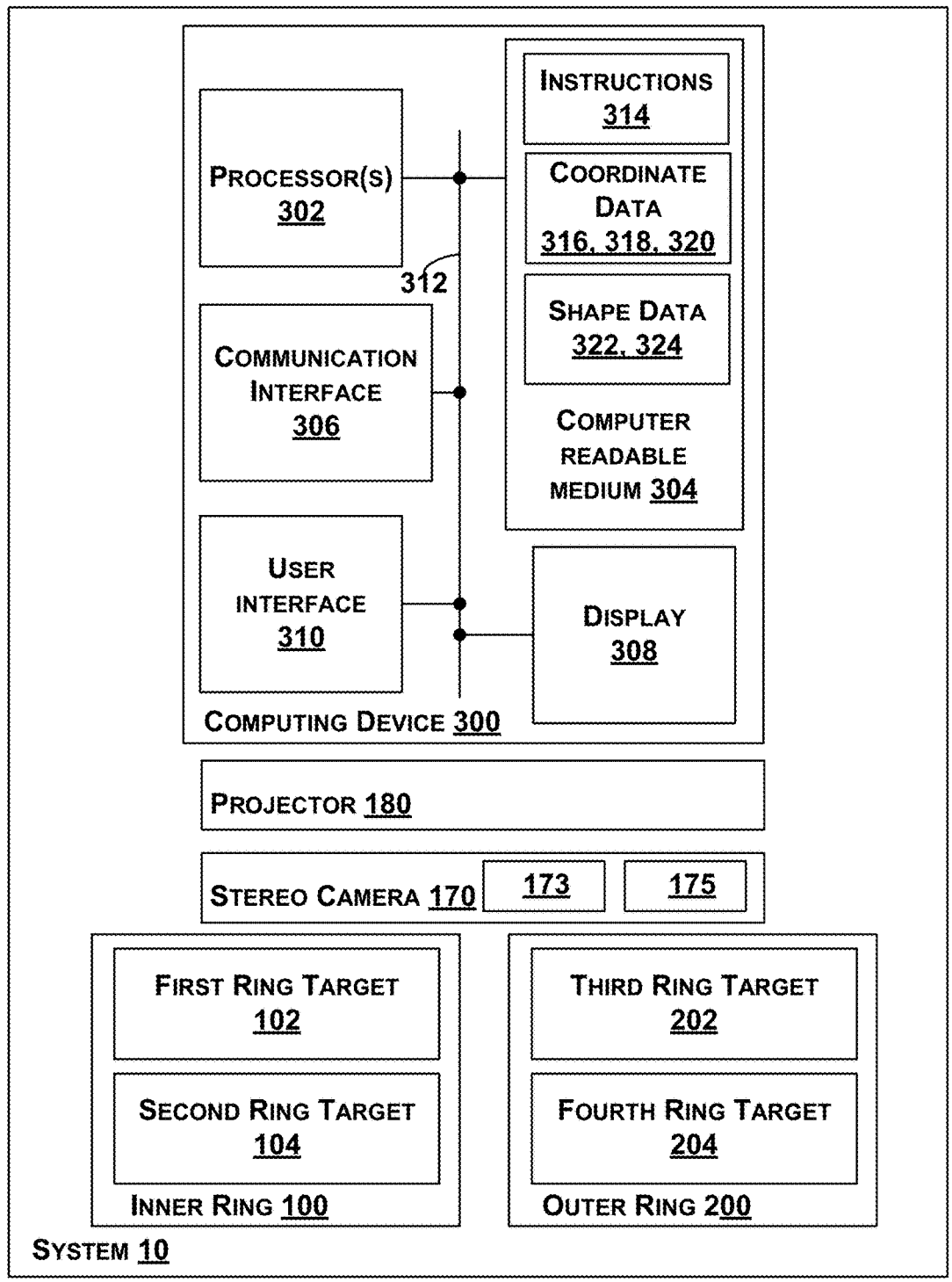
FIG. 3 is a schematic diagram of system, according to an example.

FIG. 3 is a block diagram of the system 10, which includes a computing device 300. In some examples, components of the computing device 300 are distributed across multiple computing devices. However, for the sake of example, the components are shown and described as part of the computing device 300. The computing device 300 can be or include a mobile device (such as a mobile phone), a desktop computer, a laptop computer, a tablet computer, a server, a network of multiple servers, or similar device(s) that can be configured to perform the functions described herein.

As shown in FIG. 3, the computing device 300 includes one or more processors 302, a non-transitory computer readable medium 304, a communication interface 306, a display 308, and a user interface 310. Components of the computing device 300 illustrated in FIG. 1 are linked together by a system bus, network, or other connection mechanism 312.

The one or more processors 302 can be any type of processor(s), such as a microprocessor, a digital signal processor, a multicore processor, etc., coupled to the non-transitory computer readable medium 304.

The non-transitory computer readable medium 304 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 304 can be configured to store instructions 314. The instructions 314 are executable by the one or more processors 302 to cause the computing device 300 to perform any of the functions of the computing device 300 described herein. For example, the instructions 314 can include instructions for controlling a stereo camera 170 via the communication interface 306. The non-transitory computer readable medium 304 can also be configured to store first coordinate data 316, second coordinate data 318, and third coordinate data 320 that is generated by the system 10, as described below.

The communication interface 306 can include hardware to enable communication within the computing device 300 and/or between the computing device 300 and one or more other devices. The hardware can include transmitters, receivers, and antennas, for example. The communication interface 306 can be configured to facilitate communication with one or more other devices, in accordance with one or more wired or wireless communication protocols. For example, the communication interface 306 can be configured to facilitate wireless data communication for the computing device 300 according to one or more wireless communication standards, such as one or more Institute of Electrical and Electronics Engineers (IEEE) 801.11 standards, ZigBee standards, Bluetooth standards, etc. As another example, the communication interface 306 can be configured to facilitate wired data communication with one or more other devices.

The display 308 can be any type of display component configured to display data. As one example, the display 308 can include a touchscreen display. As another example, the display 308 can include a flat-panel display, such as a liquid-crystal display (LCD) or a light-emitting diode (LED) display.

The user interface 310 can include one or more pieces of hardware used to provide data and control signals to the computing device 300. For instance, the user interface 310 can include a mouse or a pointing device, a keyboard or a keypad, a microphone, a touchpad, or a touchscreen, among other possible types of user input devices. Generally, the user interface 310 can enable an operator to interact with a graphical user interface (GUI) provided by the computing device 300 (e.g., displayed by the display 308).

The system 10 also includes an inner ring 100 and an outer ring 200. The inner ring 100 includes a first ring target 102 and a second ring target 104. The outer ring 200 includes a third ring target 202 and a fourth ring target 204.

The system 10 also includes a projector 180 (e.g., an optical projector) and the stereo camera 170. The stereo camera 170 includes a left camera 173 and a right camera 175.

Figure 4:
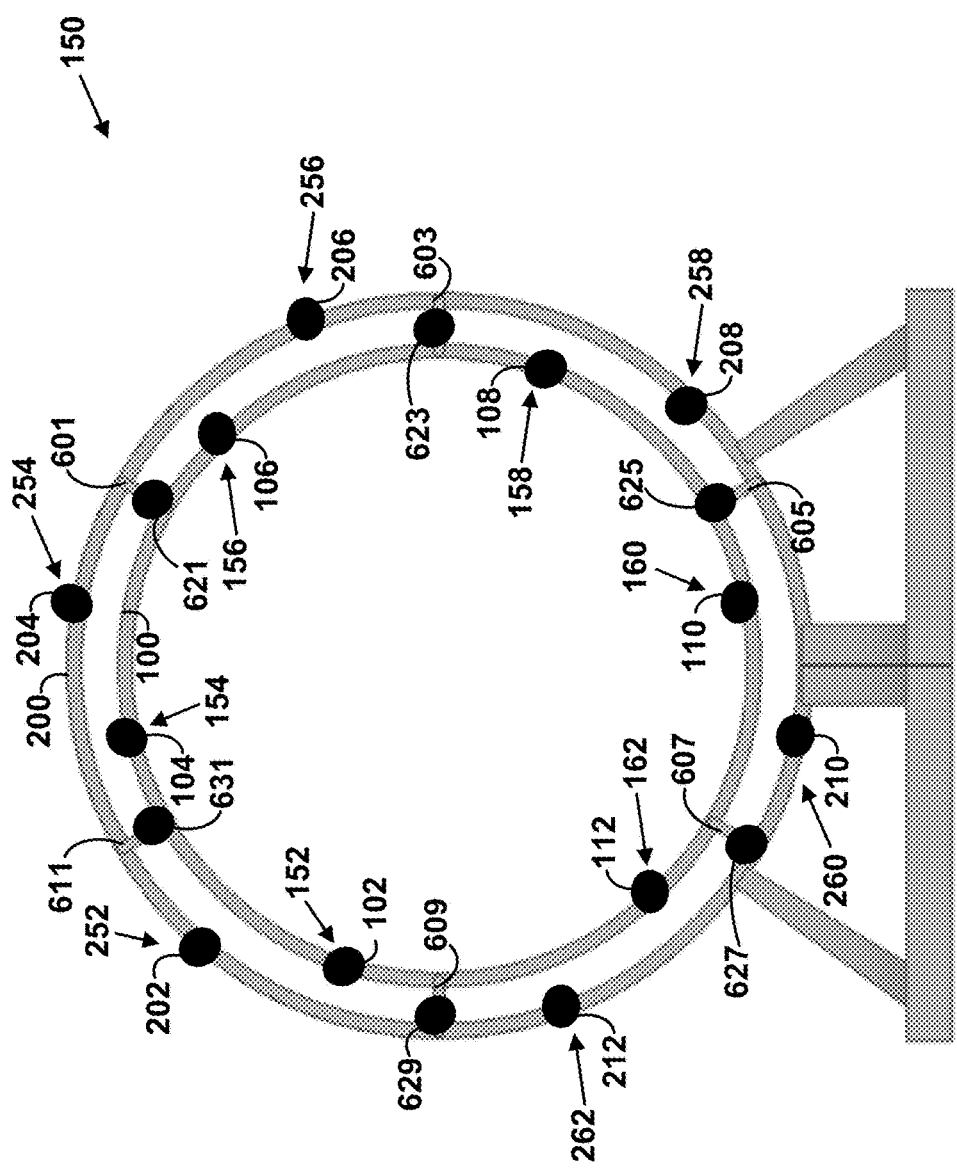
FIG. 4 is a schematic diagram of system, according to an example.

FIG. 4 is schematic diagram of the inner ring 100 and the outer ring 200, which can collectively be referred to as a ring structure 150. As shown, the inner ring 100 includes the first ring target 102 at a first position 152 on the inner ring 100 and the second ring target 104 at a second position 154 on the inner ring 100. The inner ring 100 further includes a ring target 106 at a position 156, a ring target 108 at a position 158, a ring target 110 at a position 160, and a ring target 112 at a position 162.

The outer ring 200 includes the third ring target 202 at a third position 252 and the fourth ring target 204 at a fourth position 254. The outer ring 200 further includes a ring target 206 at a position 256, a ring target 208 at a position 258, a ring target 210 at a position 260, and a ring target 212 at a position 262.

The ring structure 150 also includes a protrusion 601, a protrusion 603, a protrusion 605, a protrusion 607, a protrusion 609, and a protrusion 611. The protrusions extend beyond the inner ring 100 and the outer ring 200 in a direction (e.g., out of the page) that is perpendicular to a plane that contains the inner ring 100 and the outer ring 200. The protrusions 601-611 can have a u-shape or a horseshoe shape with ends that are affixed respectively to the inner ring 100 and the outer ring 200.

The protrusion 601 includes a protrusion target 621, the protrusion 603 includes a protrusion target 623, the protrusion 605 includes a protrusion target 625, the protrusion 607 includes a protrusion target 627, and the protrusion 609 includes a protrusion target 629. In various examples, the protrusion targets 621-629 appear in left or right images of one or more of the stereo image pairs described below, according to positions of the protrusion targets 621-629 shown in FIG. 4 and the respective fields of view of the stereo image pairs discussed below. As such, the positions of the protrusions captured in those stereo image pairs can be used to generate coordinate data that defines surfaces within a three-dimensional coordinate space as described below.

Figure 18:
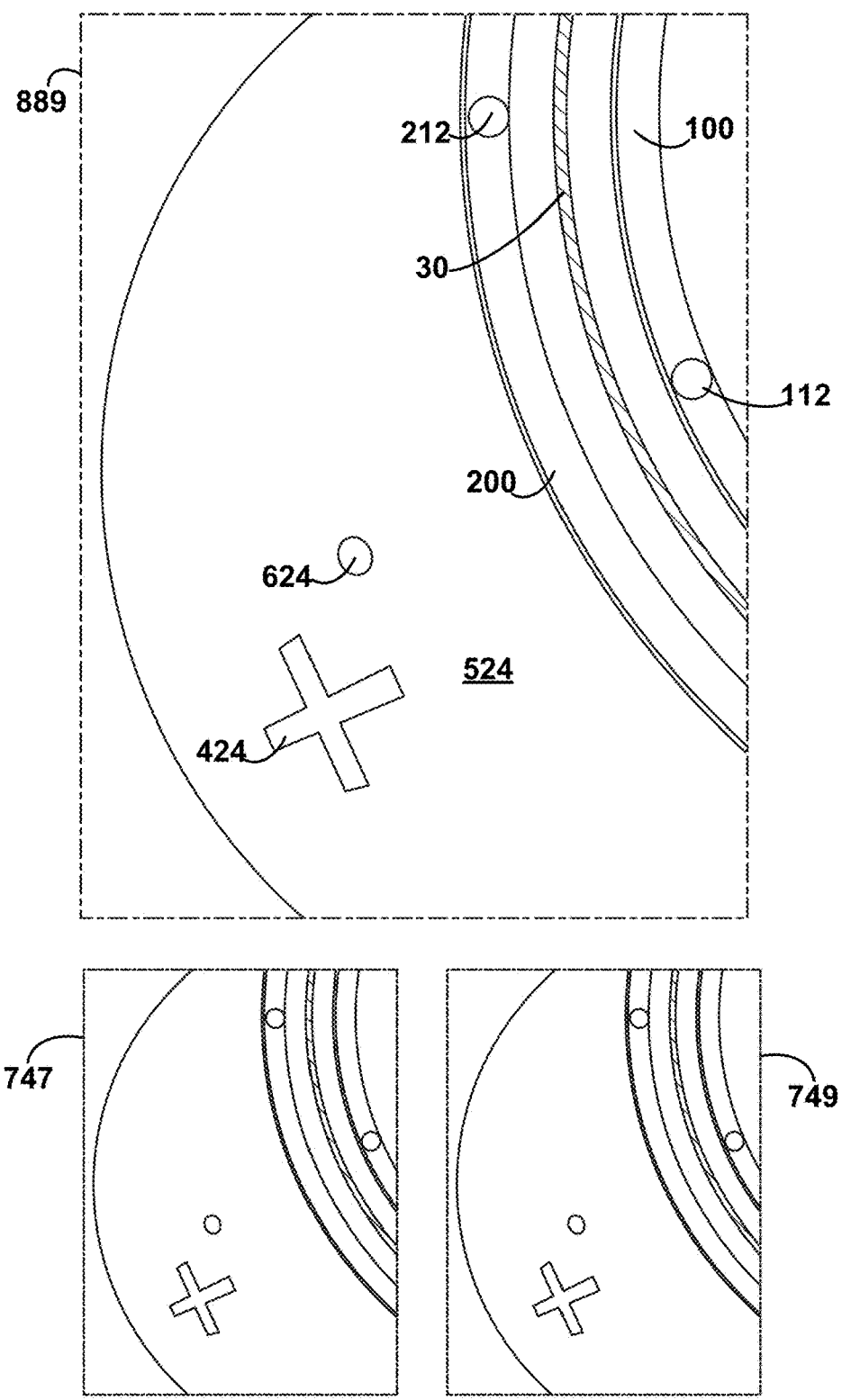
FIG. 18 is a schematic diagram of a system and an outer radial surface of a structural component, according to an example.
Figure 19:
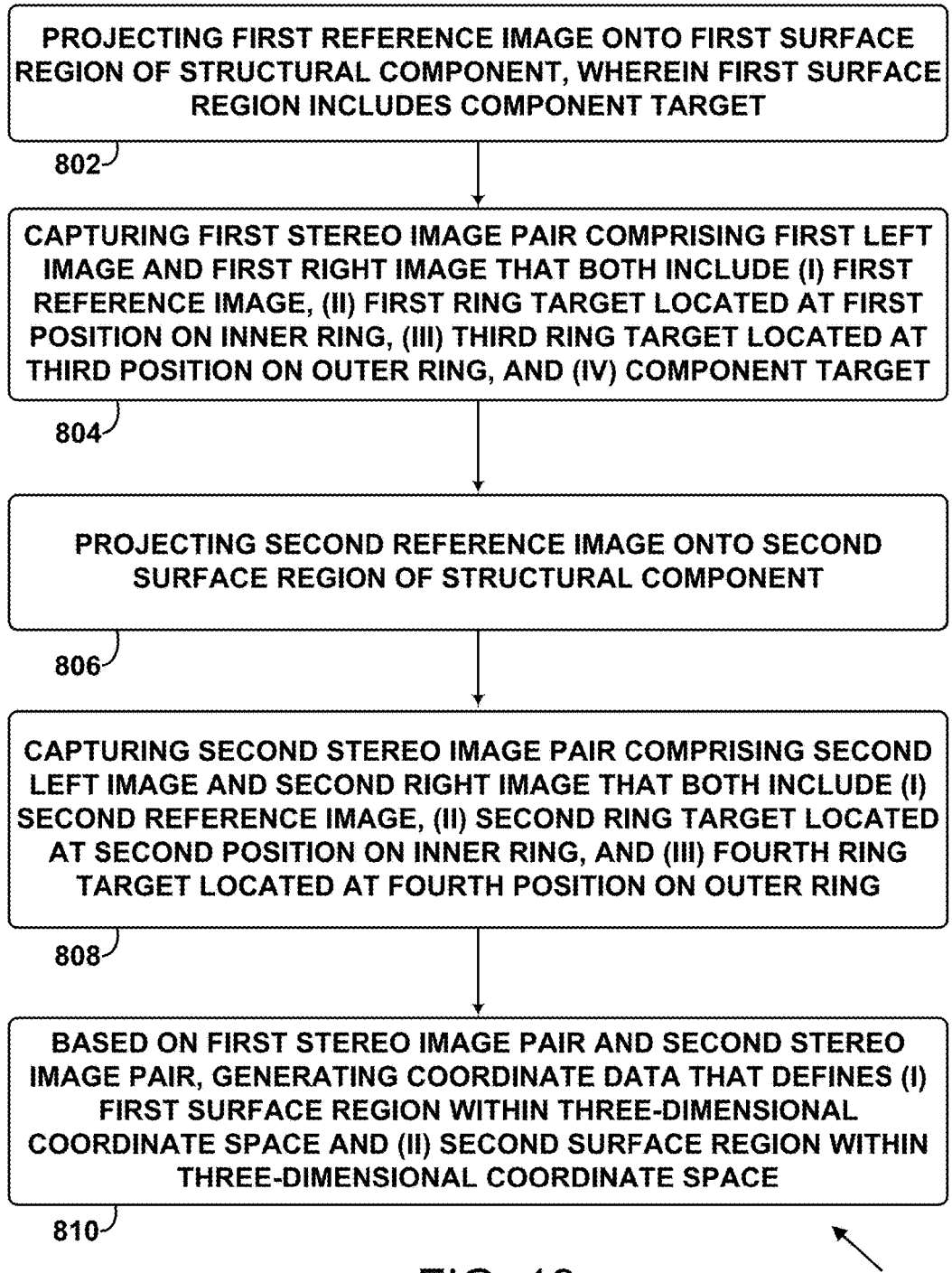
FIG. 19 is a block diagram of a method, according to an example.
Figure 20:
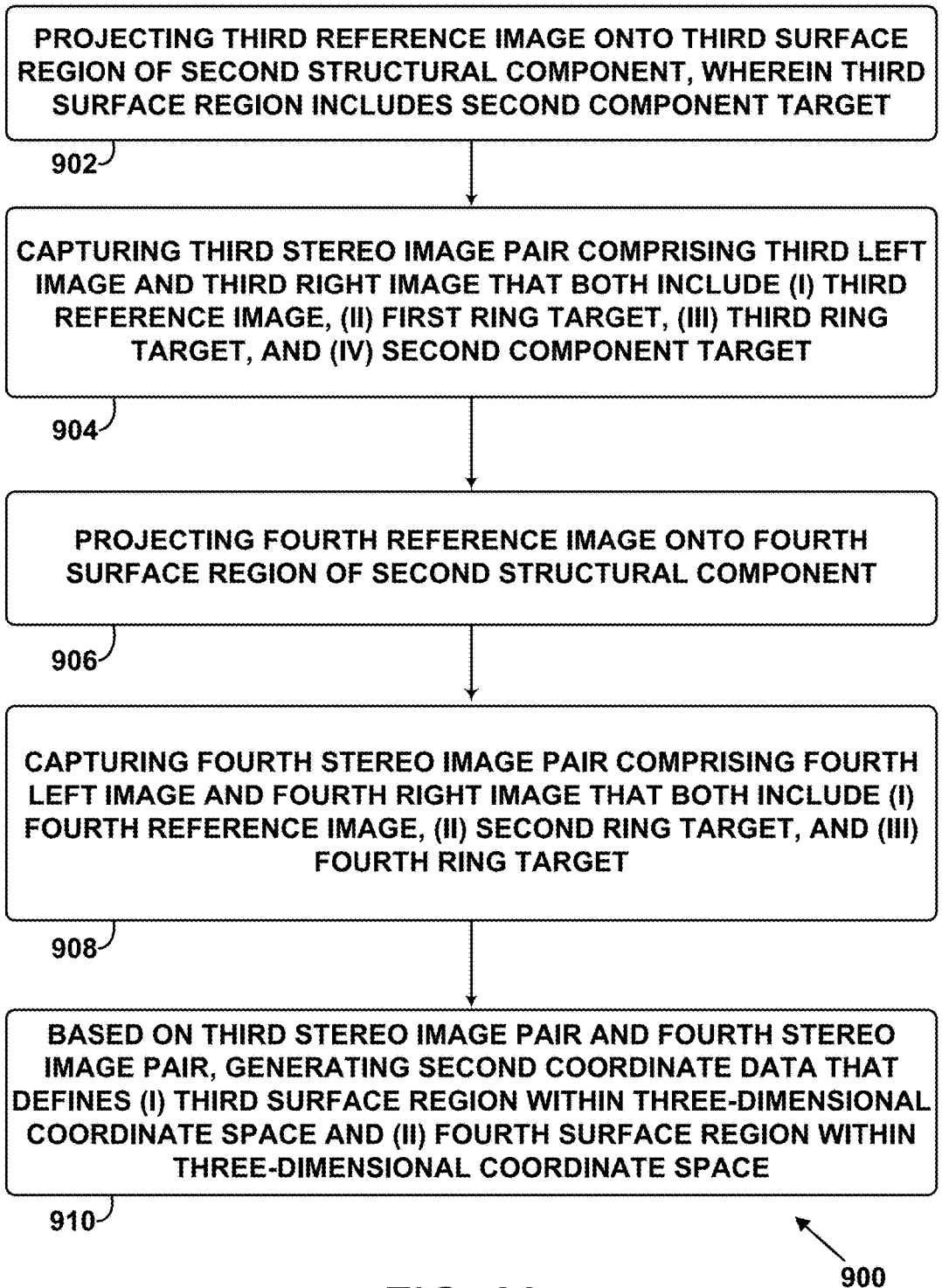
FIG. 20 is a block diagram of a method, according to an example.
Figure 24:
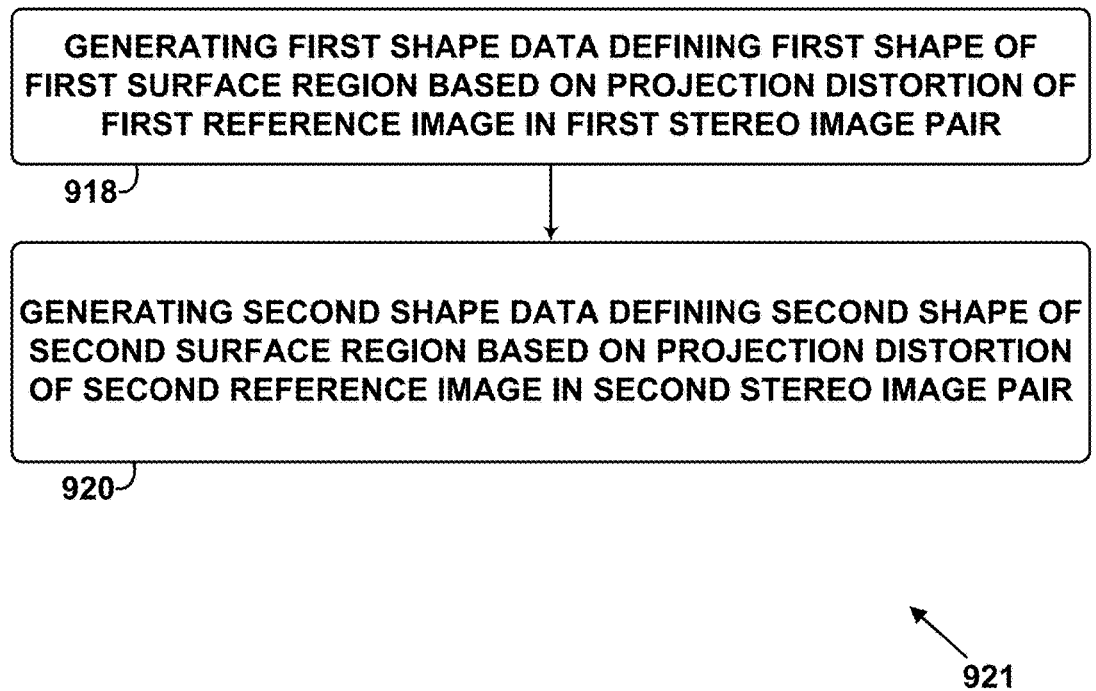
FIG. 24 is a block diagram of a method, according to an example.

FIGS. 5-18 further depict the system 10 and functionality related to the method 800 shown in FIG. 19, the method 900 shown in FIG. 20, the method 913 shown in FIG. 21, the method 915 shown in FIG. 22, the method 917 shown in FIG. 23, and the method 921 shown in FIG. 24.

Figure 5:
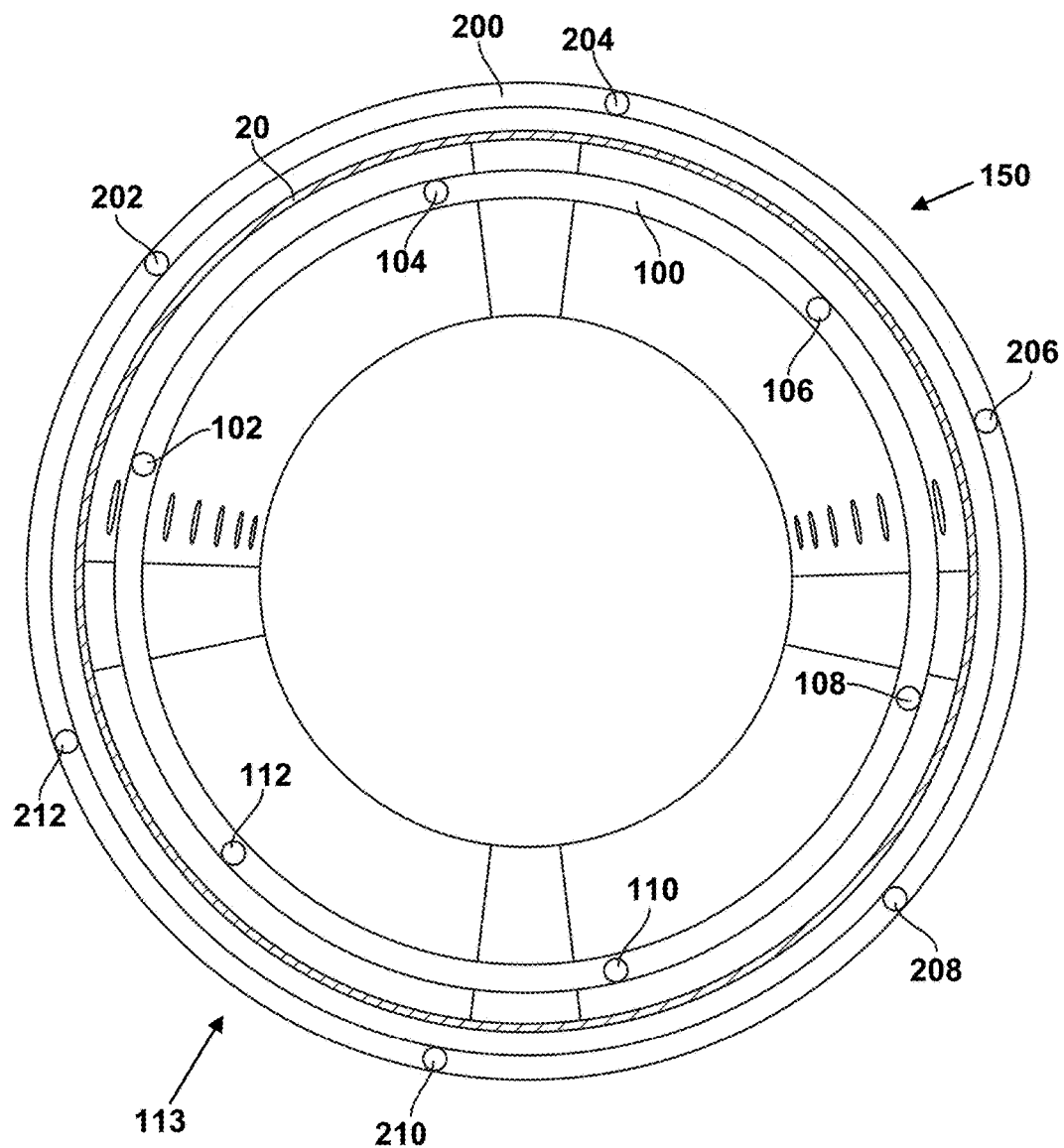
FIG. 5 is a schematic end view of a system and a structural component, according to an example.

FIG. 5 is an end view of the female end 113 of the first structural component 20 with the ring structure 150 being positioned in front of the female end 113. In FIGS. 5-11, the protrusions 601-611 and the protrusion targets 621-629 are omitted for the purpose of clarity. The ring structure 150 can be moved (e.g., rolled on a wheeled platform) into the position shown in FIG. 5 prior to performing the functionality depicted in FIGS. 6-11.

FIGS. 6-11 depict fields of view of the stereo camera that include the female end 113, images captured by the stereo camera, and images projected by the projector onto an inner radial surface of the first structural component 20, but the stereo camera (i.e., the left camera and the right camera) and the projector are omitted from FIGS. 6-11 for the purpose of clarity.

As depicted in FIG. 6, the stereo camera and the projector can be positioned via a robotic arm or the like to project an image within a field of view 699 and to capture images of the field of view 699. More specifically, the projector projects a first reference image 402 onto a first surface region 502 of the first structural component 20. The first surface region 502 includes a component target 602.

Next, the stereo camera captures a first stereo image pair 702. That is, the left camera captures a first left image 703 and the right camera captures a first right image 705. The first left image 703 and the first right image 705 both include the first reference image 402, the first ring target 102, the third ring target 202, and the component target 602.

As depicted in FIG. 7, the stereo camera and the projector can be positioned to project an image within a field of view 799 and to capture images of the field of view 799. More specifically, the projector projects a second reference image 404 onto a second surface region 504 of the first structural component 20. The second surface region 504 optionally includes a component target 604.

Next, the stereo camera captures a second stereo image pair 704. That is, the left camera captures a second left image 707 and the right camera captures a second right image 709. The second left image 707 and the second right image 709 both include the second reference image 404, the second ring target 104, the fourth ring target 204, and optionally the component target 604.

In some examples, only the first surface region 502 and the second surface region 504 need be characterized with respect to a common coordinate space. More specifically, the system 10 can use the first stereo image pair 702 and the second stereo image pair 704 to generate coordinate data that defines (i) the first surface region 502 within a three-dimensional coordinate space and (ii) the second surface region 504 within the same three-dimensional coordinate space. That is, the system 10 can virtually "stich" the first surface region 502 and the second surface region 504 together within the three-dimensional coordinate space. The ring structure 150 and the ring targets can provide a frame of reference that allows the two surface regions to be defined within the same three-dimensional coordinate space.

Referring to FIG. 6, for example, the first reference image 402 will generally appear differently in the first left image 703 when compared to the first right image 705 due to projection distortion caused by the shape of the first surface region 502 and the different points of view of the cameras. The difference in projection distortion can be used to generate shape data that defines the shape of the first surface region 502. The position and/or orientation of the first surface region 502 within the three-dimensional coordinate space can be determined based on (i) the first shape data, (ii) a position of the first ring target 102 within the first stereo image pair 702, (iii) a position of the third ring target 202 within the first stereo image pair 702, and (iv) a position of the component target 602 within the first stereo image pair 702.

Referring to FIG. 7, the second reference image 404 will also generally appear differently in the second left image 707 when compared to the second right image 709 due to projection distortion caused by the shape of the second surface region 504 and the different points of view of the cameras. The difference in projection distortion can be used to generate shape data that defines the shape of the second surface region 504. The position and/or orientation of the second surface region 504 within the (same) coordinate space can be determined based on (i) the second shape data, (ii) a position of the second ring target 104 within the second stereo image pair 704, and (iii) a position of the fourth ring target 204 within the second stereo image pair 704. The second stereo image pair 704 need not capture a component target on the second surface region 504.

In examples described below with respect to FIGS. 8-11, additional surface regions of the first structural component 20 are analyzed such that an entirety of the inner radial surface of the first structural component 20 can be defined by coordinate data. This process can be repeated for the second structural component 30, as described below with reference to FIGS. 12-18. The coordinate data defining the inner radial surface of the first structural component 20 and the coordinate data defining the outer radial surface of the second structural component 30 can be used to characterize a radial gap between those two surfaces and to manufacture a shim that substantially fills the gap.

Figure 8:
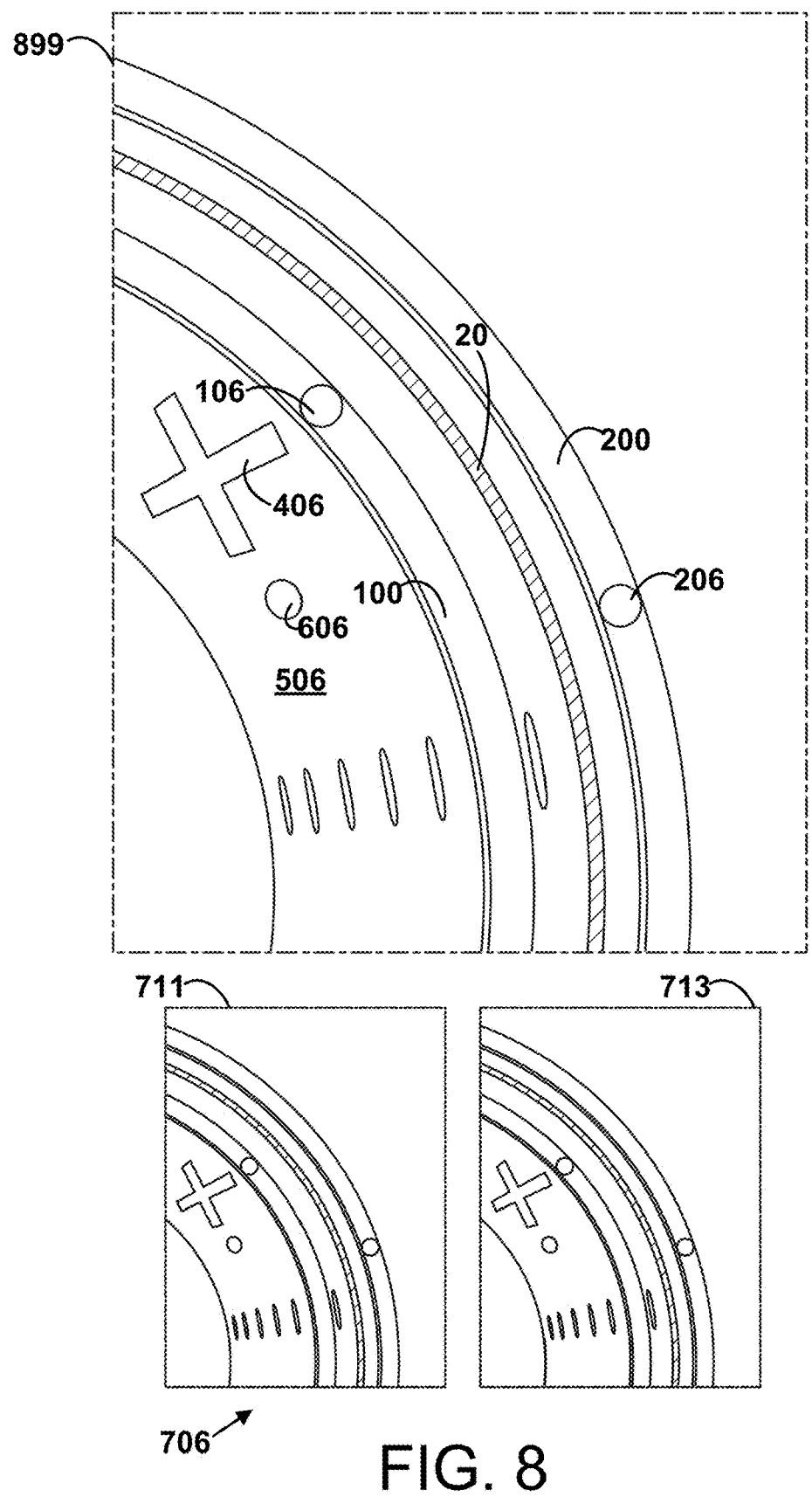
FIG. 8 is a schematic diagram of a system and an inner radial surface of a structural component, according to an example.

As depicted in FIG. 8, the stereo camera and the projector can be positioned to project an image within a field of view 899 and to capture images of the field of view 899. More specifically, the projector projects a reference image 406 onto a surface region 506 of the first structural component 20. The surface region 506 optionally includes a component target 606.

Next, the stereo camera captures a stereo image pair 706. That is, the left camera captures a left image 711 and the right camera captures a right image 713. The left image 711 and the right image 713 both include the reference image 406, the ring target 106, the ring target 206, and optionally the component target 606.

Figure 9:
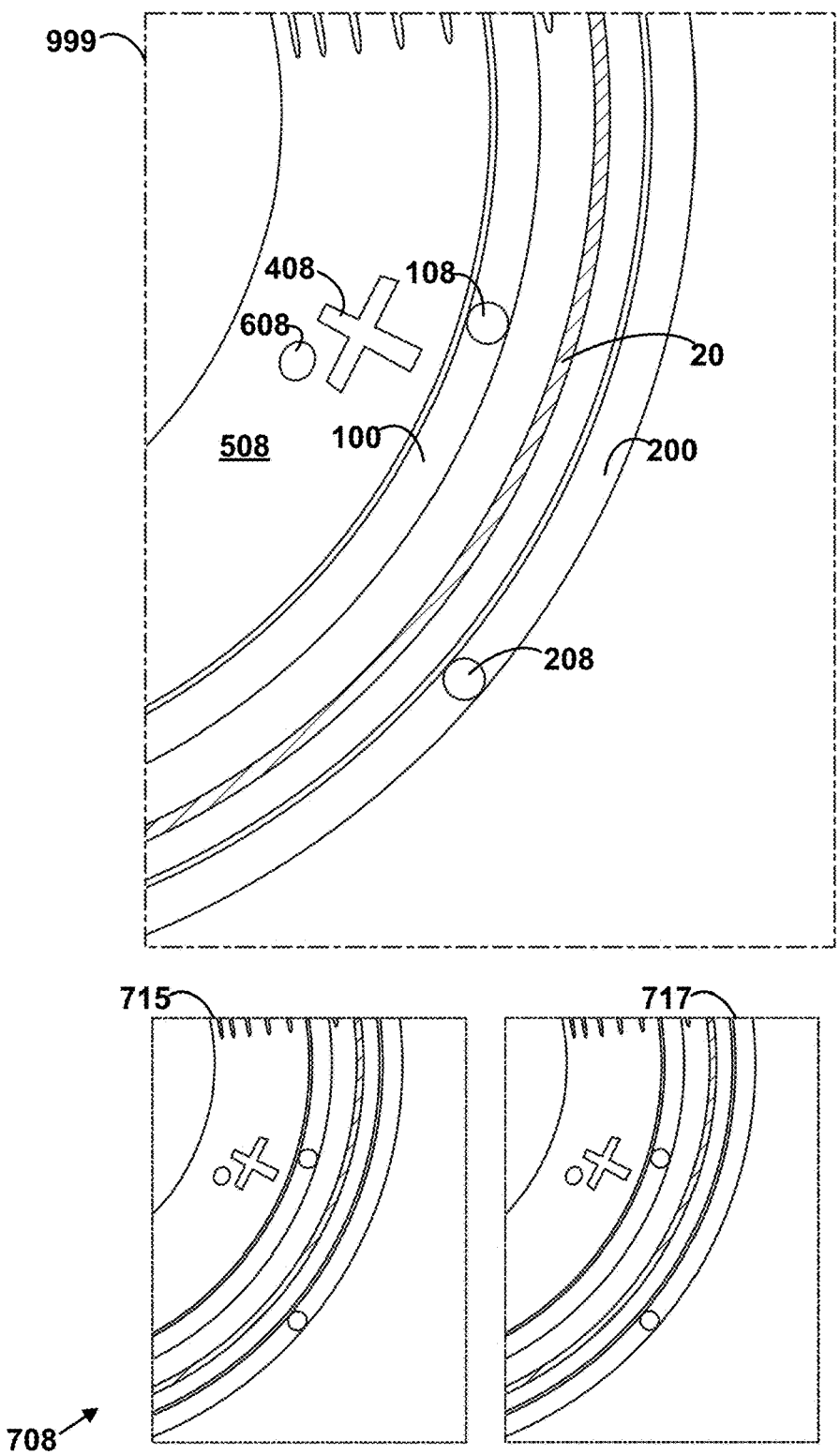
FIG. 9 is a schematic diagram of a system and an inner radial surface of a structural component, according to an example.

As depicted in FIG. 9, the stereo camera and the projector can be positioned to project an image within a field of view 999 and to capture images of the field of view 999. More specifically, the projector projects a reference image 408 onto a surface region 508 of the first structural component 20. The surface region 508 optionally includes a component target 608.

Next, the stereo camera captures a stereo image pair 708. That is, the left camera captures a left image 715 and the right camera captures a right image 717. The left image 715 and the right image 717 both include the reference image 408, the ring target 108, the ring target 208, and optionally the component target 608.

Figure 10:
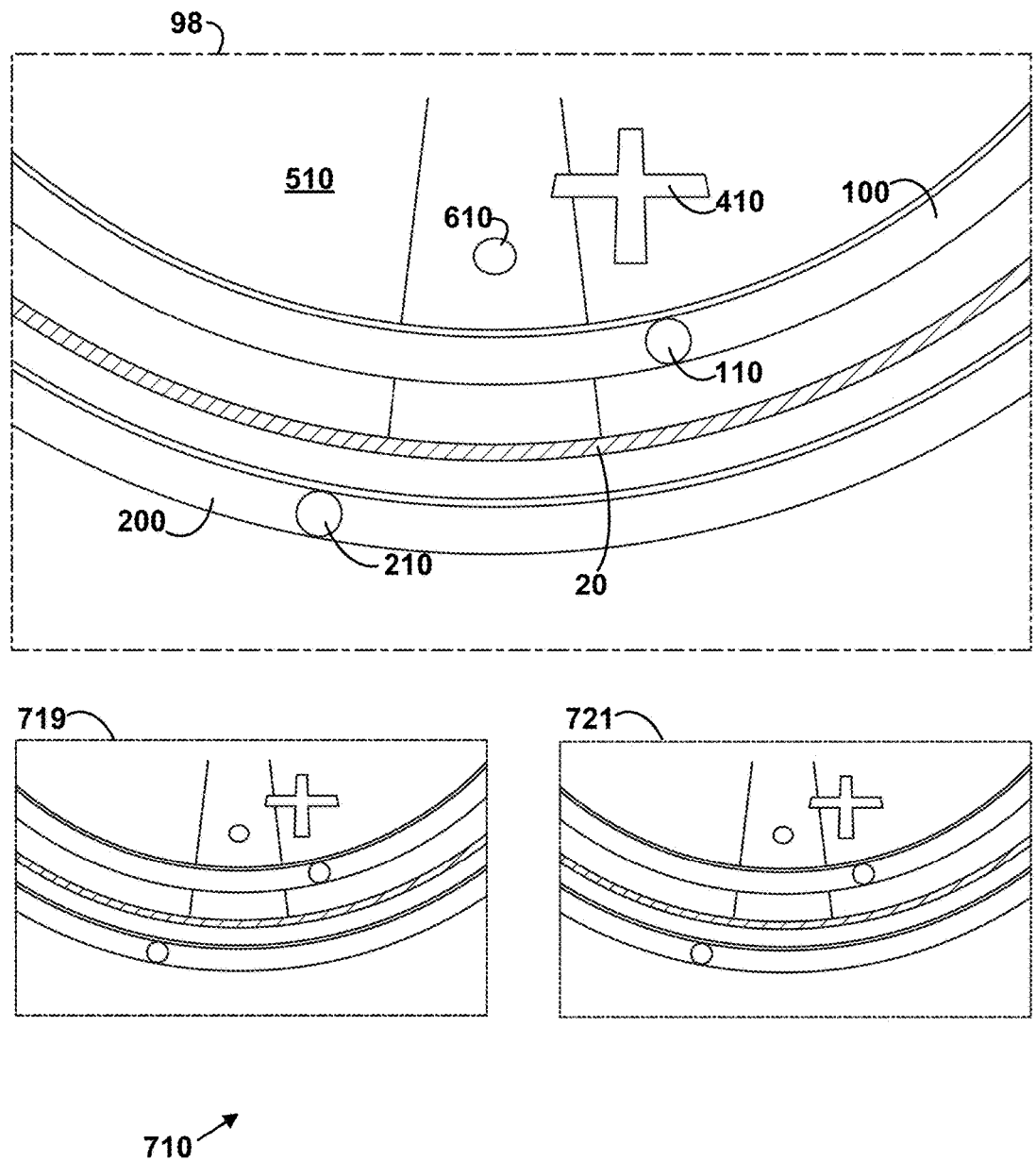
FIG. 10 is a schematic diagram of a system and an inner radial surface of a structural component, according to an example.

As depicted in FIG. 10, the stereo camera and the projector can be positioned to project an image within a field of view 98 and to capture images of the field of view 98. More specifically, the projector projects a reference image 410 onto a surface region 510 of the first structural component 20. The surface region 510 optionally includes a component target 610.

Next, the stereo camera captures a stereo image pair 710. That is, the left camera captures a left image 719 and the right camera captures a right image 721. The left image 719 and the right image 721 both include the reference image 410, the ring target 110, the ring target 210, and optionally the component target 610.

Figure 11:
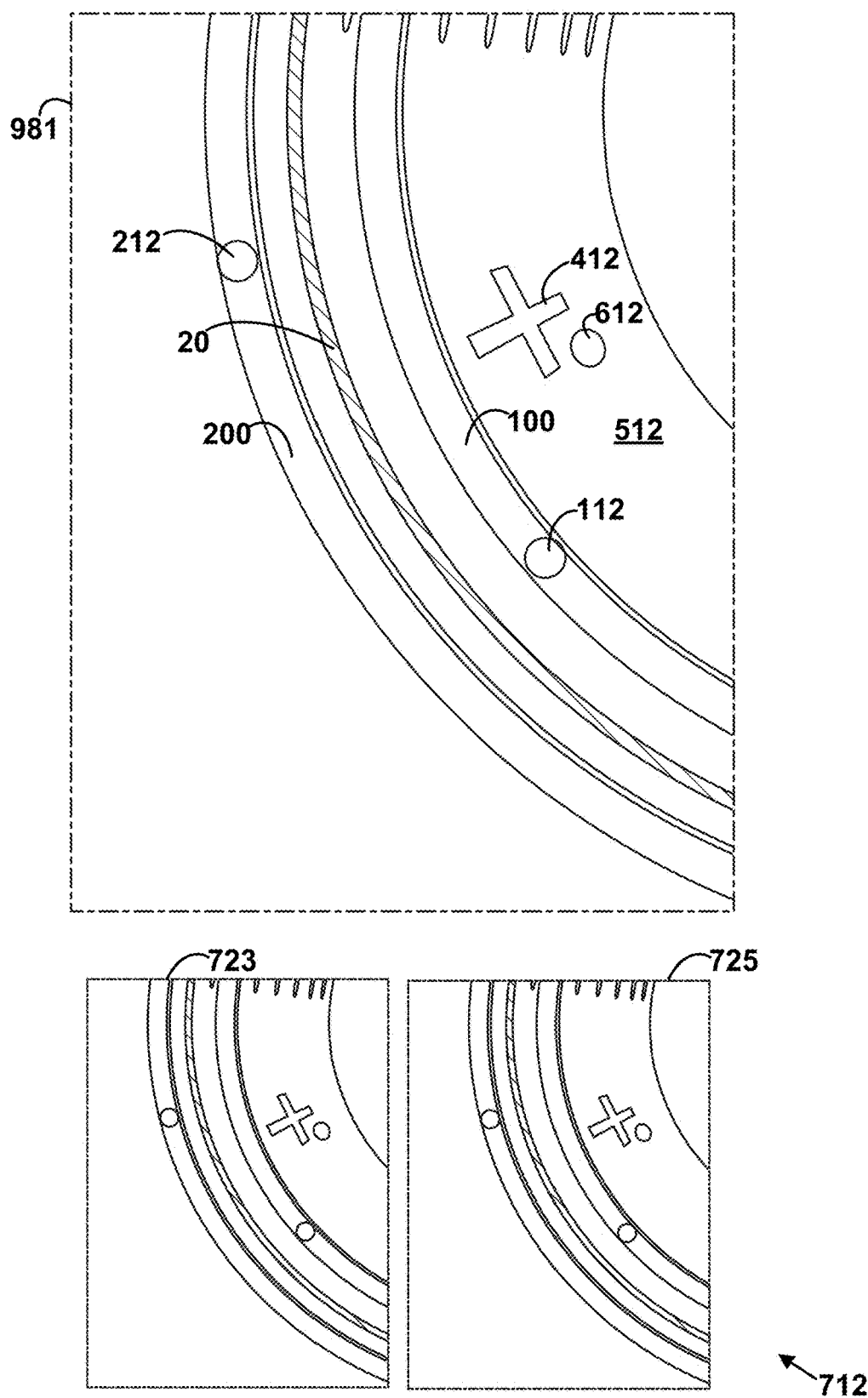
FIG. 11 is a schematic diagram of a system and an inner radial surface of a structural component, according to an example.

As depicted in FIG. 11, the stereo camera and the projector can be positioned to project an image within a field of view 981 and to capture images of the field of view 981. More specifically, the projector projects a reference image 412 onto a surface region 512 of the first structural component 20. The surface region 512 optionally includes a component target 612.

Next, the stereo camera captures a stereo image pair 712. That is, the left camera captures a left image 723 and the right camera captures a right image 725. The left image 723 and the right image 725 both include the reference image 412, the ring target 112, the ring target 212, and optionally the component target 612.

Figure 12:
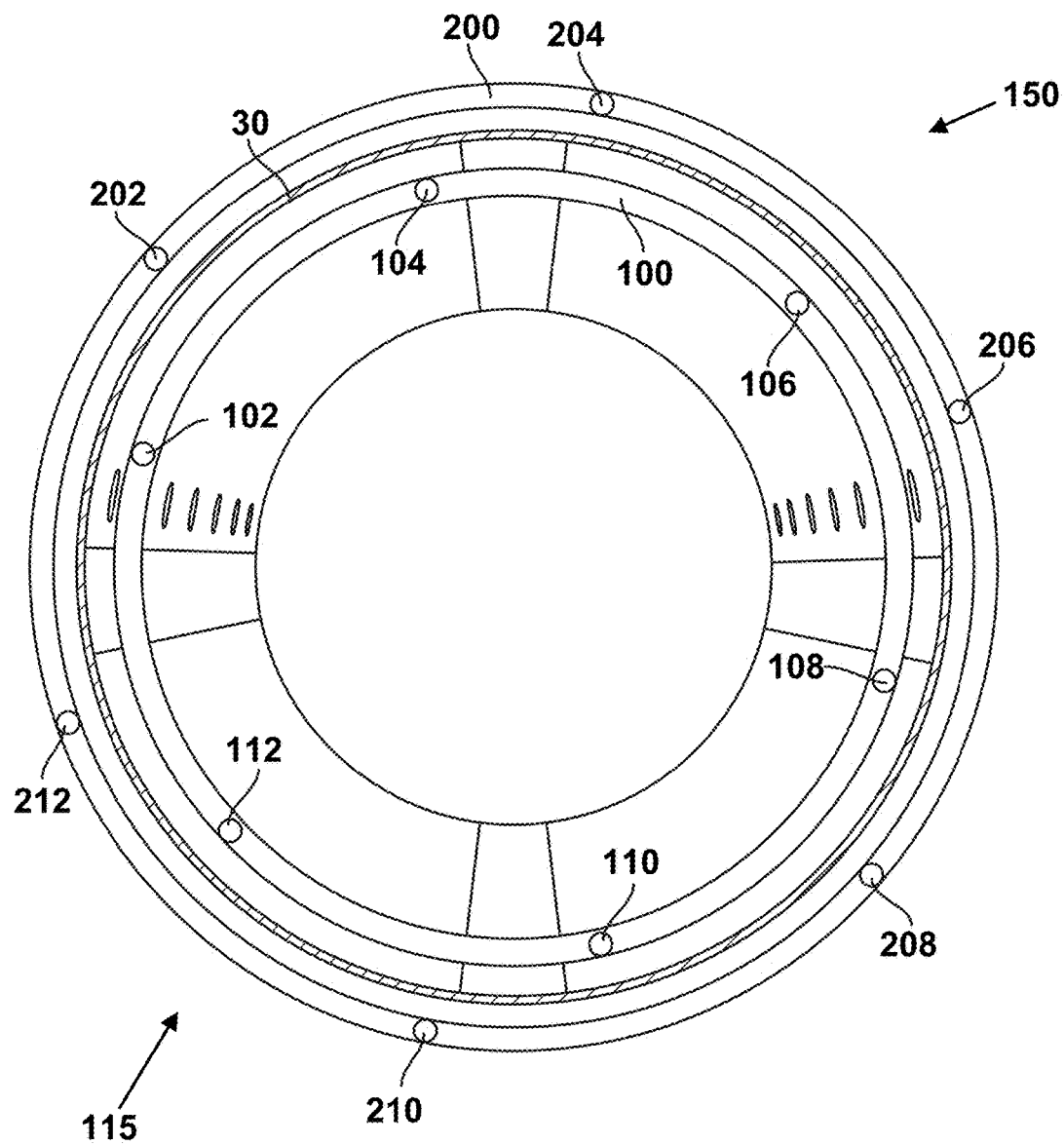
FIG. 12 is a schematic end view of a system and a structural component, according to an example.

FIG. 12 is an end view of the male end 115 of the second structural component 30 with the ring structure 150 being positioned in front of the male end 115. In FIGS. 13-18, the protrusions 601-611 and the protrusion targets 621-629 are omitted for the purpose of clarity. The ring structure 150 can be moved (e.g., rolled on a wheeled platform) into the position shown in FIG. 12 prior to the functionality depicted in FIGS. 13-18 being performed.

FIGS. 13-18 depict fields of view of the stereo camera that include the male end 115, images captured by the stereo camera, and images projected by the projector onto an outer radial surface of the second structural component 30, but the stereo camera (i.e., the left camera and the right camera) and the projector are omitted from FIGS. 13-18 for the purpose of clarity.

Figure 13:
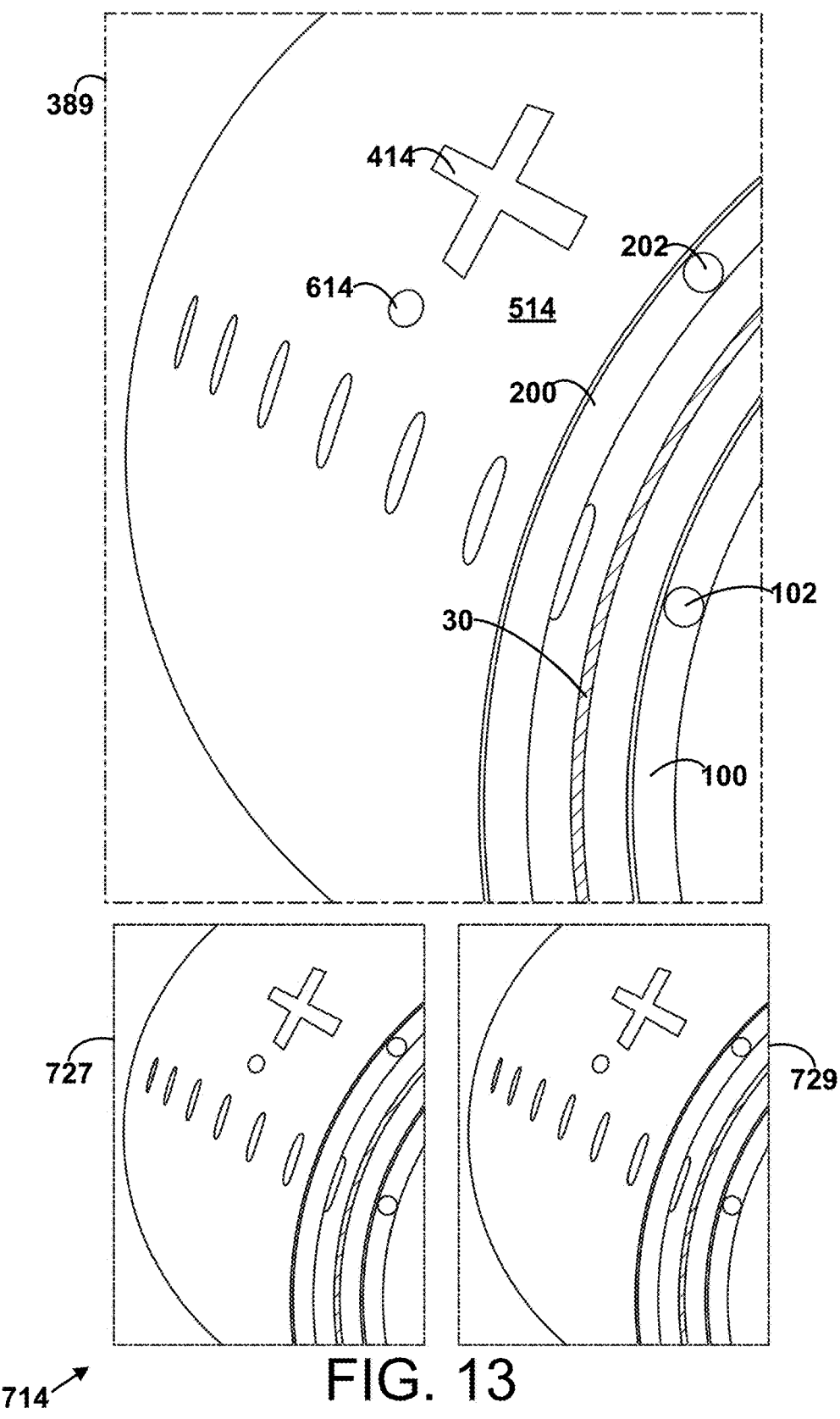
FIG. 13 is a schematic diagram of a system and an outer radial surface of a structural component, according to an example.

As depicted in FIG. 13, the stereo camera and the projector can be positioned to project an image within a field of view 389 and to capture images of the field of view 389. More specifically, the projector projects a third reference image 414 onto a third surface region 514 of the second structural component 30. The third surface region 514 includes a second component target 614.

Next, the stereo camera captures a third stereo image pair 714. That is, the left camera captures a third left image 727 and the right camera captures a third right image 729. The third left image 727 and the third right image 729 both include the third reference image 414, the first ring target 102, the third ring target 202, and the second component target 614.

Figure 14:
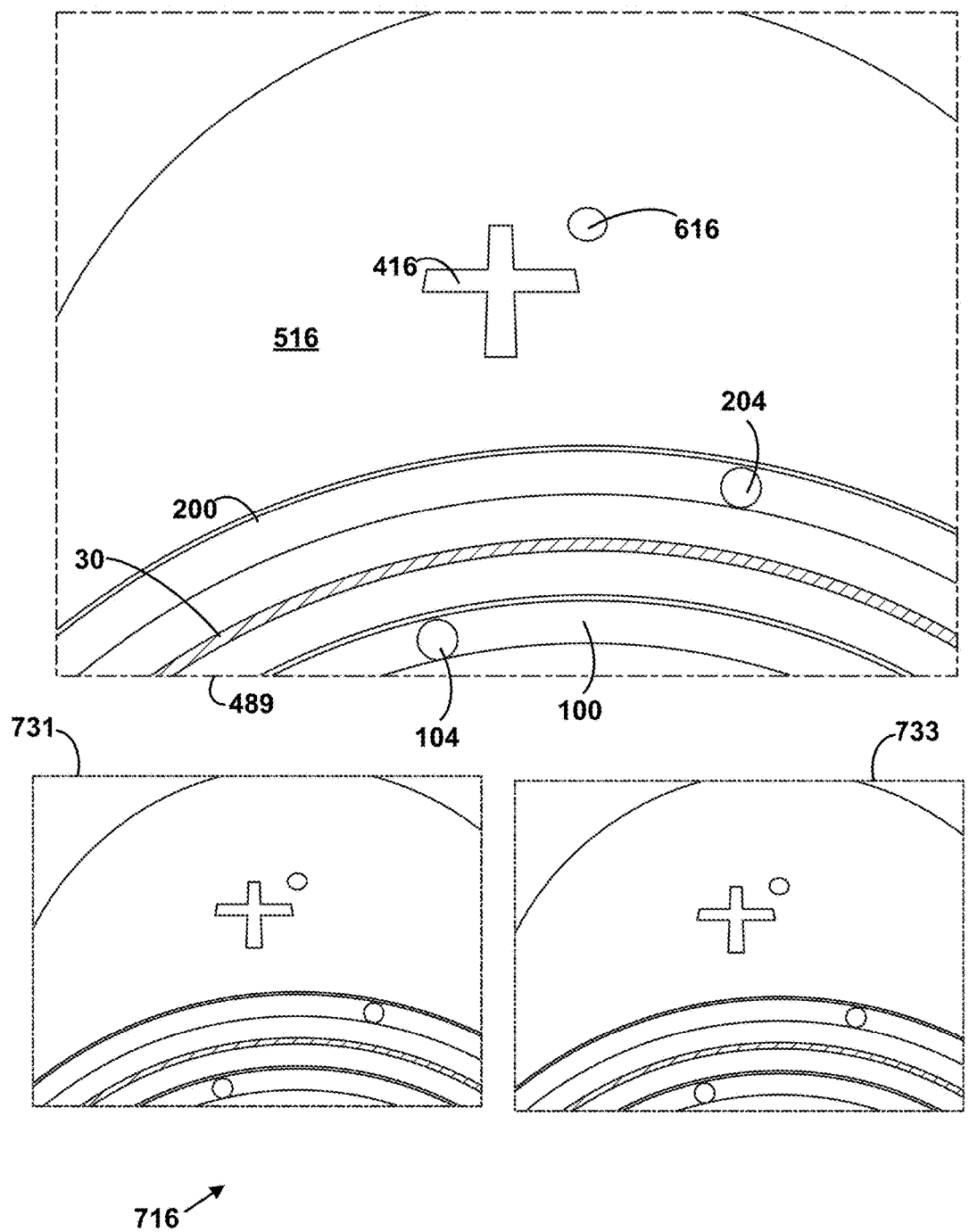
FIG. 14 is a schematic diagram of a system and an outer radial surface of a structural component, according to an example.

As depicted in FIG. 14, the stereo camera and the projector can be positioned to project an image within a field of view 489 and to capture images of the field of view 489.

More specifically, the projector projects a fourth reference image 416 onto a fourth surface region 516 of the second structural component 30. The fourth surface region 516 optionally includes a component target 616.

Next, the stereo camera captures a fourth stereo image pair 716. That is, the left camera captures a fourth left image 731 and the right camera captures a fourth right image 733. The fourth left image 731 and the fourth right image 733 both include the fourth reference image 416, the second ring target 104, the fourth ring target 204, and optionally the component target 616.

Figure 15:
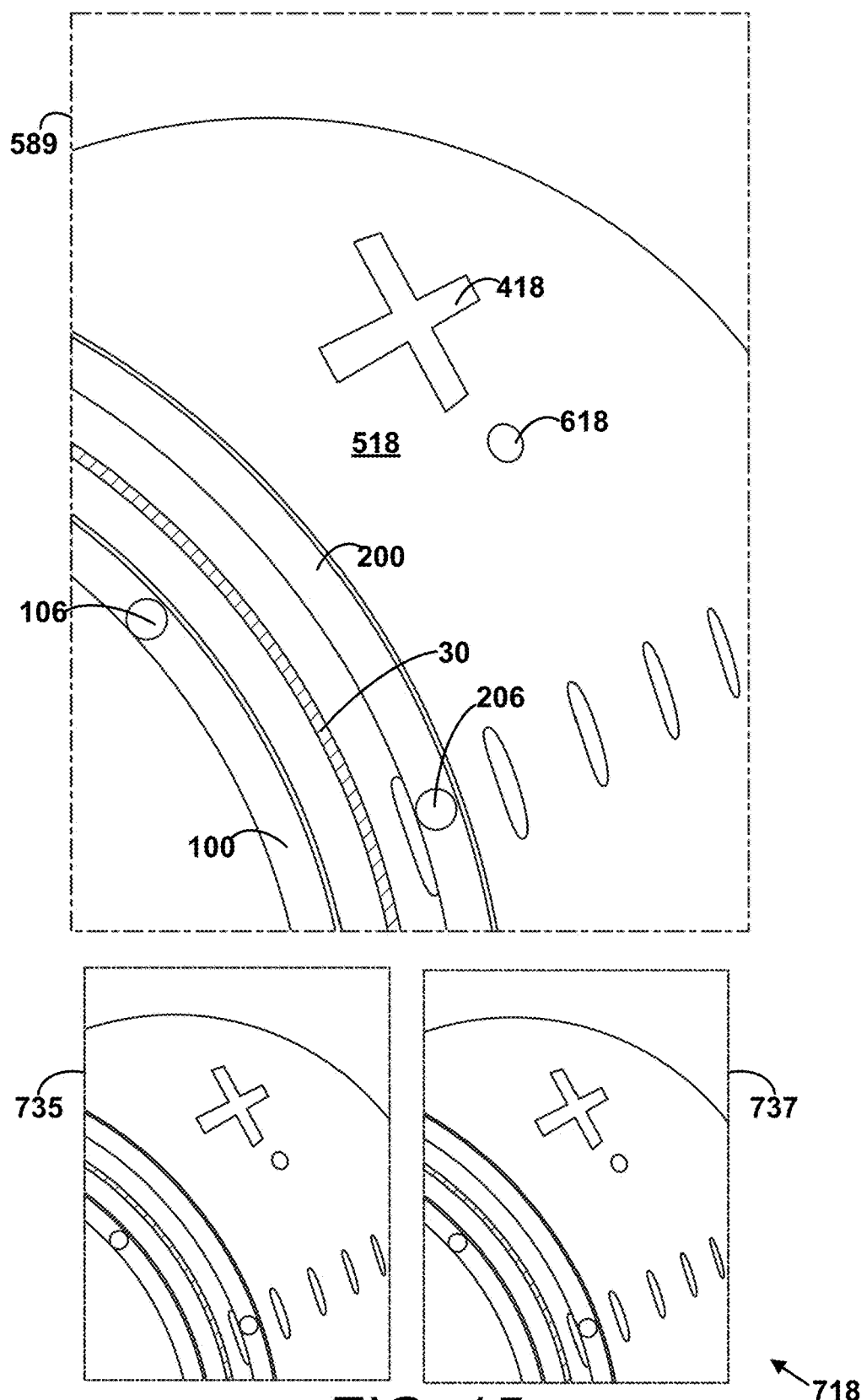
FIG. 15 is a schematic diagram of a system and an outer radial surface of a structural component, according to an example.

As depicted in FIG. 15, the stereo camera and the projector can be positioned to project an image within a field of view 589 and to capture images of the field of view 589. More specifically, the projector projects a reference image 418 onto a surface region 518 of the second structural component 30. The surface region 518 optionally includes a component target 618.

Next, the stereo camera captures a stereo image pair 718. That is, the left camera captures a left image 735 and the right camera captures a right image 737. The left image 735 and the right image 737 both include the reference image 418, the ring target 106, the ring target 206, and optionally the component target 618.

As depicted in FIG. 16, the stereo camera and the projector can be positioned to project an image within a field of view 689 and to capture images of the field of view 689. More specifically, the projector projects a reference image 420 onto a surface region 520 of the second structural component 30. The surface region 520 optionally includes a component target 620.

Next, the stereo camera captures a stereo image pair 720. That is, the left camera captures a left image 739 and the right camera captures a right image 741. The left image 739 and the right image 741 both include the reference image 420, the ring target 108, the ring target 208, and optionally the component target 620.

Figure 17:
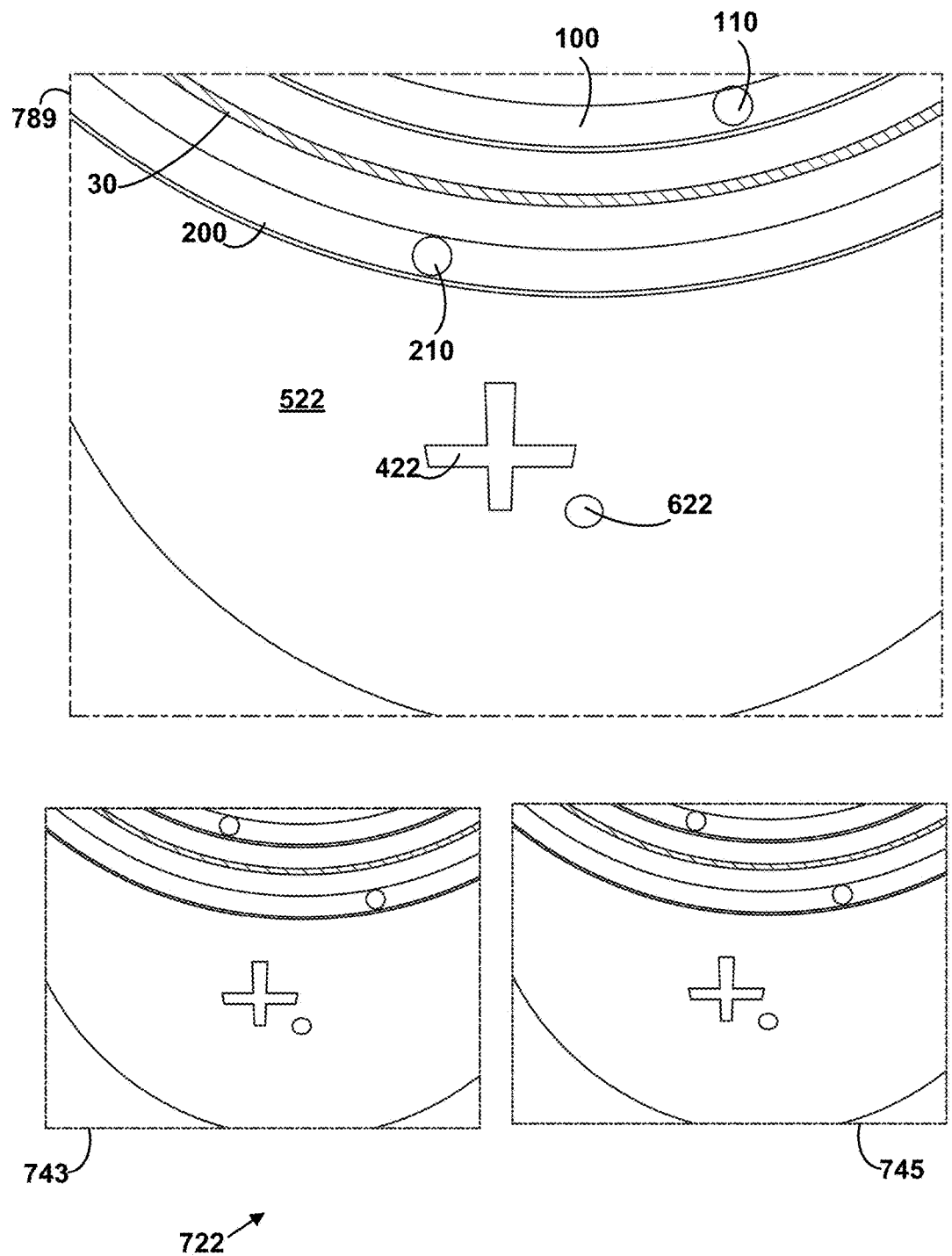
FIG. 17 is a schematic diagram of a system and an outer radial surface of a structural component, according to an example.

As depicted in FIG. 17, the stereo camera and the projector can be positioned to project an image within a field of view 789 and to capture images of the field of view 789. More specifically, the projector projects a reference image 422 onto a surface region 522 of the second structural component 30. The surface region 522 optionally includes a component target 622.

Next, the stereo camera captures a stereo image pair 722. That is, the left camera captures a left image 743 and the right camera captures a right image 745. The left image 743 and the right image 745 both include the reference image 422, the ring target 110, the ring target 210, and optionally the component target 622.

As depicted in FIG. 18, the stereo camera and the projector can be positioned to project an image within a field of view 889 and to capture images of the field of view 889. More specifically, the projector projects a reference image 424 onto a surface region 524 of the second structural component 30. The surface region 524 optionally includes a component target 624.

Next, the stereo camera captures a stereo image pair 724. That is, the left camera captures a left image 747 and the right camera captures a right image 749. The left image 747 and the right image 749 both include the reference image 424, the ring target 112, the ring target 212, and optionally the component target 624.

FIGS. 19-24 show flowcharts of the method 800, the method 900, the method 913, the method 915, the method 917, and the method 921 for characterizing a surface of a structural component, according to example implementations. The method 800, the method 900, the method 913, the method 915, the method 917, and the method 921 present examples of methods that could be used with the system 10 shown in FIG. 1 and could be performed with components illustrated in FIGS. 1-18. As shown in FIGS. 19-24, the method 900, the method 913, the method 915, the method 917, and the method 921 include one or more operations, functions, or actions as illustrated by blocks 802, 804, 806, 808, 810, 902, 904, 906, 908, 910, 912, 914, 916, 918, and 920. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Referring to FIG. 19, block 802 of the method 800 includes projecting, by the projector 180, the first reference image 402 onto the first surface region 502 of the first structural component 20, wherein the first surface region 502 includes the component target 602.

At block 804, the method 800 includes capturing, by the stereo camera 170, the first stereo image pair 702 comprising the first left image 703 and the first right image 705 that both include (i) the first reference image 402, (ii) the first ring target 102 located at the first position 152 on the inner ring 100, (iii) the third ring target 202 located at the third position 252 on the outer ring 200, and (iv) the component target 602.

At block 806, the method 800 includes projecting, by the projector 180, the second reference image 404 onto the second surface region 504 of the first structural component 20.

At block 808, the method 800 includes capturing, by the stereo camera 170, the second stereo image pair 704 comprising the second left image 707 and the second right image 709 that both include (i) the second reference image 404, (ii) the second ring target 104 located at the second position 154 on the inner ring 100, and (iii) the fourth ring target 204 located at the fourth position 254 on the outer ring 200.

At block 810, the method 800 includes based on the first stereo image pair 702 and the second stereo image pair 704, the system 10 generating the first coordinate data 316 that defines (i) the first surface region 502 within the three-dimensional coordinate space 111 and (ii) the second surface region 504 within the three-dimensional coordinate space 111.

Referring to FIG. 20, block 902 of the method 900 includes projecting, by the projector 180, the third reference image 414 onto the third surface region 514 of the second structural component 30, wherein the third surface region 514 includes the second component target 614.

At block 904, the method 900 includes capturing, by the stereo camera 170, the third stereo image pair 714 comprising the third left image 727 and the third right image 729 that both include (i) the third reference image 414, (ii) the first ring target 102, (iii) the third ring target 202, and (iv) the second component target 614.

At block 906, the method 900 includes projecting, by the projector 180, the fourth reference image 416 onto the fourth surface region 516 of the second structural component 30.

At block 908, the method 900 includes capturing, by the stereo camera 170, the fourth stereo image pair 716 comprising the fourth left image 731 and the fourth right image 733 that both include (i) the fourth reference image 416, (ii) the second ring target 104, and (iii) the fourth ring target 204.

At block 910, the method 900 includes, based on the third stereo image pair 714 and the fourth stereo image pair 716, generating the second coordinate data 318 that defines (i) the third surface region 514 within the three-dimensional coordinate space 111 and (ii) the fourth surface region 516 within the three-dimensional coordinate space 111.

Referring to FIG. 21, block 912 of the method 913 includes, prior to capturing the third stereo image pair 714 and capturing the fourth stereo image pair 716, positioning the inner ring 100 and the outer ring 200 adjacent to the male end 115 of the second structural component 30 that is configured for the male-to-female connection with the first structural component 20.

Referring to FIG. 22, block 914 of the method 915 includes, based on the first coordinate data 316 and the second coordinate data 318, generating the third coordinate data 320 representing dimensions of the shim 319 configured for substantially filling the three-dimensional volume between the female end 113 of the first structural component 20 and the male end 115 of the second structural component 30.

Referring to FIG. 23, block 916 of the method 917 includes, based on the first coordinate data 316 and the second coordinate data 318, generating the third coordinate data 320 representing the three-dimensional volume between the female end 113 of the first structural component 20 and the male end 115 of the second structural component 30.

Referring to FIG. 24, block 918 of the method 921 includes generating the first shape data 322 defining the first shape 323 of the first surface region 502 based on projection distortion of the first reference image 402 in the first stereo image pair 702.

At block 920, the method 921 includes generating the second shape data 324 defining the second shape 325 of the second surface region 504 based on projection distortion of the second reference image 404 in the second stereo image pair 704.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Examples of the present disclosure can thus relate to one of the enumerated clauses (EC) listed below.

EC 1 is a system for characterizing a surface of a structural component, the system comprising: an inner ring comprising a first ring target at a first position on the inner ring and a second ring target at a second position on the inner ring; and an outer ring comprising a third ring target at a third position on the outer ring and a fourth ring target at a fourth position on the outer ring; one or more processors; and a computer readable medium storing instructions that, when executed by the one or more processors, cause the system to perform functions comprising: projecting a first reference image onto a first surface region of the structural component, wherein the first surface region includes a component target; capturing a first stereo image pair comprising a first left image and a first right image that both include (i) the first reference image, (ii) the first ring target, (iii) the third ring target, and (iv) the component target; projecting a second reference image onto a second surface region of the structural component; capturing a second stereo image pair comprising a second left image and a second right image that both include (i) the second reference image, (ii) the second ring target, and (iii) the fourth ring target; and based on the first stereo image pair and the second stereo image pair, generating coordinate data that defines (i) the first surface region within a three-dimensional coordinate space and (ii) the second surface region within the three-dimensional coordinate space.

EC 2 is the system of EC 1, wherein a projection of the outer ring onto a plane defined by the inner ring substantially surrounds the inner ring.

EC 3 is the system of any of ECs 1-2, wherein the inner ring is substantially parallel to the outer ring.

EC 4 is the system of any of ECs 1-2, wherein the inner ring is substantially coplanar with the outer ring.

EC 5 is the system of EC 4, further comprising a protrusion that extends beyond the inner ring and the outer ring in a direction that is perpendicular to a plane that contains the inner ring and the outer ring, wherein the protrusion comprises a protrusion target, and wherein capturing the first stereo image pair comprises additionally capturing the protrusion target within the first left image and the first right image.

EC 6 is the system of EC 4, further comprising a protrusion that extends beyond the inner ring and the outer ring in a direction that is perpendicular to a plane that contains the inner ring and the outer ring, wherein the protrusion comprises a protrusion target, and wherein capturing the second stereo image pair comprises additionally capturing the protrusion target within the second left image and the second right image.

EC 7 is the system of any of ECs 1-6, wherein the structural component is a first structural component, the coordinate data is first coordinate data, the component target is a first component target, and the functions further comprise: projecting a third reference image onto a third surface region of a second structural component, wherein the third surface region includes a second component target; capturing a third stereo image pair comprising a third left image and a third right image that both include (i) the third reference image, (ii) the first ring target, (iii) the third ring target, and (iv) the second component target; projecting a fourth reference image onto a fourth surface region of the second structural component; capturing a fourth stereo image pair comprising a fourth left image and a fourth right image that both include (i) the fourth reference image, (ii) the second ring target, and (iii) the fourth ring target; and based on the third stereo image pair and the fourth stereo image pair, generating second coordinate data that defines (i) the third surface region within the three-dimensional coordinate space and (ii) the fourth surface region within the three-dimensional coordinate space.

EC 8 is the system of EC 7, wherein the first surface region and the second surface region are part of a female end of the first structural component, and wherein the third surface region and the fourth surface region are part of a male end of the second structural component that is configured for insertion into the female end of the first structural component.

EC 9 is the system of EC 8, the functions further comprising: based on the first coordinate data and the second coordinate data, generating third coordinate data representing dimensions of a shim configured for substantially filling a three-dimensional volume between the female end of the first structural component and the male end of the second structural component.

EC 10 is the system of EC 8, the functions further comprising: based on the first coordinate data and the second coordinate data, generating third coordinate data representing a three-dimensional volume between the female end of the first structural component and the male end of the second structural component.

EC 11 is the system of any of ECs 1-10, the functions further comprising: generating first shape data defining a first shape of the first surface region based on projection distortion of the first reference image in the first stereo image pair; and generating second shape data defining a second shape of the second surface region based on projection distortion of the second reference image in the second stereo image pair, wherein generating the coordinate data comprises: determining a position and an orientation of the first surface region within the three-dimensional coordinate space based on (i) the first shape data, (ii) a position of the first ring target within the first stereo image pair, (iii) a position of the third ring target within the first stereo image pair, and (iv) a position of the component target within the first stereo image pair; and determining a position and an orientation of the second surface region within the three-dimensional coordinate space based on (i) the second shape data, (ii) a position of the second ring target within the second stereo image pair, and (iii) a position of the fourth ring target within the second stereo image pair.

EC 12 is the system of EC 11, wherein determining the position and the orientation of the first surface region comprises determining the position and the orientation of the first surface region additionally based on a position of the component target with respect to the structural component.

EC 13 is the system of any of ECs 11-12, wherein generating the first shape data comprises generating the first shape data based on a difference in projection distortion between the first reference image captured in the first left image and the first reference image captured in the first right image.

EC 14 is the system of any of ECs 1-13, wherein projecting the first reference image onto the first surface region comprises projecting a plurality of line segments onto the first surface region that become distorted based on a shape, position, and an orientation of the first surface region.

EC 15 is a non-transitory computer readable medium storing instructions that, when executed by one or more processors of a system, cause the system to perform functions for characterizing a surface of a structural component, the functions comprising: projecting a first reference image onto a first surface region of the structural component, wherein the first surface region includes a component target; capturing a first stereo image pair comprising a first left image and a first right image that both include (i) the first reference image, (ii) a first ring target located at a first position on an inner ring, (iii) a third ring target located at a third position on an outer ring, and (iv) the component target; projecting a second reference image onto a second surface region of the structural component; capturing a second stereo image pair comprising a second left image and a second right image that both include (i) the second reference image, (ii) a second ring target located at a second position on the inner ring, and (iii) a fourth ring target located at a fourth position on the outer ring; and based on the first stereo image pair and the second stereo image pair, generating coordinate data that defines (i) the first surface region within a three-dimensional coordinate space and (ii) the second surface region within the three-dimensional coordinate space.

EC 16 is a method for characterizing a surface of a structural component, the method comprising: projecting a first reference image onto a first surface region of the structural component, wherein the first surface region includes a component target; capturing a first stereo image pair comprising a first left image and a first right image that both include (i) the first reference image, (ii) a first ring target located at a first position on an inner ring, (iii) a third ring target located at a third position on an outer ring, and (iv) the component target; projecting a second reference image onto a second surface region of the structural component; capturing a second stereo image pair comprising a second left image and a second right image that both include (i) the second reference image, (ii) a second ring target located at a second position on the inner ring, and (iii) a fourth ring target located at a fourth position on the outer ring; and based on the first stereo image pair and the second stereo image pair, generating coordinate data that defines (i) the first surface region within a three-dimensional coordinate space and (ii) the second surface region within the three-dimensional coordinate space.

EC 17 is the method of EC 16, further comprising: prior to capturing the first stereo image pair and capturing the second stereo image pair, positioning the inner ring and the outer ring adjacent to an end of the structural component that is configured for a male-to-female connection with another structural component.

EC 18 is the method of any of ECs 16-17, wherein the structural component is a first structural component, the coordinate data is first coordinate data, the component target is a first component target, the method further comprising: projecting a third reference image onto a third surface region of a second structural component, wherein the third surface region includes a second component target; capturing a third stereo image pair comprising a third left image and a third right image that both include (i) the third reference image, (ii) the first ring target, (iii) the third ring target, and (iv) the second component target; projecting a fourth reference image onto a fourth surface region of the second structural component; capturing a fourth stereo image pair comprising a fourth left image and a fourth right image that both include (i) the fourth reference image, (ii) the second ring target, and (iii) the fourth ring target; and based on the third stereo image pair and the fourth stereo image pair, generating second coordinate data that defines (i) the third surface region within the three-dimensional coordinate space and (ii) the fourth surface region within the three-dimensional coordinate space.

EC 19 is the method of EC 18, further comprising: prior to capturing the third stereo image pair and capturing the fourth stereo image pair, positioning the inner ring and the outer ring adjacent to an end of the second structural component that is configured for a male-to-female connection with the first structural component.

EC 20 is the method of any of ECs 18-19, further comprising: based on the first coordinate data and the second coordinate data, generating third coordinate data representing dimensions of a shim configured for substantially filling a three-dimensional volume between a female end of the first structural component and a male end of the second structural component.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A system for characterizing a surface of a structural component, the system comprising:
an inner ring comprising a first ring target at a first position on the inner ring and a second ring target at a second position on the inner ring; and
an outer ring comprising a third ring target at a third position on the outer ring and a fourth ring target at a fourth position on the outer ring;
one or more processors; and
a computer readable medium storing instructions that, when executed by the one or more processors, cause the system to perform functions comprising:
projecting a first reference image onto a first surface region of the structural component, wherein the first surface region includes a component target;
capturing a first stereo image pair comprising a first left image and a first right image that both include (i) the first reference image, (ii) the first ring target, (iii) the third ring target, and (iv) the component target;
projecting a second reference image onto a second surface region of the structural component;
capturing a second stereo image pair comprising a second left image and a second right image that both include (i) the second reference image, (ii) the second ring target, and (iii) the fourth ring target; and
based on the first stereo image pair and the second stereo image pair, generating coordinate data that defines (i) the first surface region within a three-dimensional coordinate space and (ii) the second surface region within the three-dimensional coordinate space.

2. The system of claim 1, wherein a projection of the outer ring onto a plane defined by the inner ring substantially surrounds the inner ring.

3. The system of claim 1, wherein the inner ring is substantially parallel to the outer ring.

4. The system of claim 1, wherein the inner ring is substantially coplanar with the outer ring.

5. The system of claim 4, further comprising a protrusion that extends beyond the inner ring and the outer ring in a direction that is perpendicular to a plane that contains the inner ring and the outer ring,
wherein the protrusion comprises a protrusion target, and
wherein capturing the first stereo image pair comprises additionally capturing the protrusion target within the first left image and the first right image.

6. The system of claim 4, further comprising a protrusion that extends beyond the inner ring and the outer ring in a direction that is perpendicular to a plane that contains the inner ring and the outer ring,
wherein the protrusion comprises a protrusion target, and
wherein capturing the second stereo image pair comprises additionally capturing the protrusion target within the second left image and the second right image.

7. The system of claim 1, wherein the structural component is a first structural component, the coordinate data is first coordinate data, the component target is a first component target, and the functions further comprise:
projecting a third reference image onto a third surface region of a second structural component, wherein the third surface region includes a second component target;
capturing a third stereo image pair comprising a third left image and a third right image that both include (i) the third reference image, (ii) the first ring target, (iii) the third ring target, and (iv) the second component target;
projecting a fourth reference image onto a fourth surface region of the second structural component;
capturing a fourth stereo image pair comprising a fourth left image and a fourth right image that both include (i) the fourth reference image, (ii) the second ring target, and (iii) the fourth ring target; and
based on the third stereo image pair and the fourth stereo image pair, generating second coordinate data that defines (i) the third surface region within the three-dimensional coordinate space and (ii) the fourth surface region within the three-dimensional coordinate space.

8. The system of claim 7,
wherein the first surface region and the second surface region are part of a female end of the first structural component, and
wherein the third surface region and the fourth surface region are part of a male end of the second structural component that is configured for insertion into the female end of the first structural component.

9. The system of claim 8, the functions further comprising:
based on the first coordinate data and the second coordinate data, generating third coordinate data representing dimensions of a shim configured for substantially filling a three-dimensional volume between the female end of the first structural component and the male end of the second structural component.

10. The system of claim 8, the functions further comprising:
based on the first coordinate data and the second coordinate data, generating third coordinate data representing a three-dimensional volume between the female end of the first structural component and the male end of the second structural component.

11. The system of claim 1, the functions further comprising:
generating first shape data defining a first shape of the first surface region based on projection distortion of the first reference image in the first stereo image pair; and
generating second shape data defining a second shape of the second surface region based on projection distortion of the second reference image in the second stereo image pair, wherein generating the coordinate data comprises:
determining a position and an orientation of the first surface region within the three-dimensional coordinate space based on (i) the first shape data, (ii) a position of the first ring target within the first stereo image pair, (iii) a position of the third ring target within the first stereo image pair, and (iv) a position of the component target within the first stereo image pair; and
determining a position and an orientation of the second surface region within the three-dimensional coordinate space based on (i) the second shape data, (ii) a position of the second ring target within the second stereo image pair, and (iii) a position of the fourth ring target within the second stereo image pair.

12. The system of claim 11, wherein determining the position and the orientation of the first surface region comprises determining the position and the orientation of the first surface region additionally based on a position of the component target with respect to the structural component.

13. The system of claim 11, wherein generating the first shape data comprises generating the first shape data based on a difference in projection distortion between the first reference image captured in the first left image and the first reference image captured in the first right image.

14. The system of claim 1, wherein projecting the first reference image onto the first surface region comprises projecting a plurality of line segments onto the first surface region that become distorted based on a shape, position, and an orientation of the first surface region.

15. A non-transitory computer readable medium storing instructions that, when executed by one or more processors of a system, cause the system to perform functions for characterizing a surface of a structural component, the functions comprising:
- projecting a first reference image onto a first surface region of the structural component, wherein the first surface region includes a component target;
- capturing a first stereo image pair comprising a first left image and a first right image that both include (i) the first reference image, (ii) a first ring target located at a first position on an inner ring, (iii) a third ring target located at a third position on an outer ring, and (iv) the component target;
- projecting a second reference image onto a second surface region of the structural component;
- capturing a second stereo image pair comprising a second left image and a second right image that both include (i) the second reference image, (ii) a second ring target located at a second position on the inner ring, and (iii) a fourth ring target located at a fourth position on the outer ring; and
- based on the first stereo image pair and the second stereo image pair, generating coordinate data that defines (i) the first surface region within a three-dimensional coordinate space and (ii) the second surface region within the three-dimensional coordinate space.

16. A method for characterizing a surface of a structural component, the method comprising:
- projecting a first reference image onto a first surface region of the structural component, wherein the first surface region includes a component target;
- capturing a first stereo image pair comprising a first left image and a first right image that both include (i) the first reference image, (ii) a first ring target located at a first position on an inner ring, (iii) a third ring target located at a third position on an outer ring, and (iv) the component target;
- projecting a second reference image onto a second surface region of the structural component;
- capturing a second stereo image pair comprising a second left image and a second right image that both include (i) the second reference image, (ii) a second ring target located at a second position on the inner ring, and (iii) a fourth ring target located at a fourth position on the outer ring; and
- based on the first stereo image pair and the second stereo image pair, generating coordinate data that defines (i) the first surface region within a three-dimensional coordinate space and (ii) the second surface region within the three-dimensional coordinate space.

17. The method of claim 16, further comprising: prior to capturing the first stereo image pair and capturing the second stereo image pair, positioning the inner ring and the outer ring adjacent to an end of the structural component that is configured for a male-to-female connection with another structural component.

18. The method of claim 16, wherein the structural component is a first structural component, the coordinate data is first coordinate data, the component target is a first component target, the method further comprising:
- projecting a third reference image onto a third surface region of a second structural component, wherein the third surface region includes a second component target;
- capturing a third stereo image pair comprising a third left image and a third right image that both include (i) the third reference image, (ii) the first ring target, (iii) the third ring target, and (iv) the second component target;
- projecting a fourth reference image onto a fourth surface region of the second structural component;
- capturing a fourth stereo image pair comprising a fourth left image and a fourth right image that both include (i) the fourth reference image, (ii) the second ring target, and (iii) the fourth ring target; and
- based on the third stereo image pair and the fourth stereo image pair, generating second coordinate data that defines (i) the third surface region within the three-dimensional coordinate space and (ii) the fourth surface region within the three-dimensional coordinate space.

19. The method of claim 18, further comprising: prior to capturing the third stereo image pair and capturing the fourth stereo image pair, positioning the inner ring and the outer ring adjacent to an end of the second structural component that is configured for a male-to-female connection with the first structural component.

20. The method of claim 18, further comprising:
- based on the first coordinate data and the second coordinate data, generating third coordinate data representing dimensions of a shim configured for substantially filling a three-dimensional volume between a female end of the first structural component and a male end of the second structural component.

* * * * *